US012018144B2

(12) United States Patent
Jing et al.

(10) Patent No.: US 12,018,144 B2
(45) Date of Patent: Jun. 25, 2024

(54) FLUOROPOLYMER COATING COMPOSITIONS COMPRISING AMINE CURING AGENTS, COATED SUBSTRATES AND RELATED METHODS

(71) Applicant: 3M INNOVATIVE PROPERTIES COMPANY, St. Paul, MN (US)

(72) Inventors: Naiyong Jing, St. Paul, MN (US); Tho Q. Nguyen, Bloomington, MN (US); Klaus Hintzer, Kastl (DE); Cheng Li, Shanghai (CN); Cheng Gu, Golden Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 727 days.

(21) Appl. No.: 17/045,836

(22) PCT Filed: Jun. 11, 2019

(86) PCT No.: PCT/US2019/036460
§ 371 (c)(1),
(2) Date: Oct. 7, 2020

(87) PCT Pub. No.: WO2019/241186
PCT Pub. Date: Dec. 19, 2019

(65) Prior Publication Data
US 2021/0139687 A1    May 13, 2021

Related U.S. Application Data

(60) Provisional application No. 62/683,727, filed on Jun. 12, 2018, provisional application No. 62/859,404, filed on Jun. 10, 2019.

(51) Int. Cl.
| | | |
|---|---|---|
| *C08L 27/18* | (2006.01) | |
| *C08J 5/18* | (2006.01) | |
| *C08K 5/06* | (2006.01) | |
| *C08K 5/17* | (2006.01) | |
| *C08K 5/5419* | (2006.01) | |
| *C08K 5/544* | (2006.01) | |
| *C08L 27/24* | (2006.01) | |
| *C09D 127/18* | (2006.01) | |

(52) U.S. Cl.
CPC ............... *C08L 27/18* (2013.01); *C08J 5/18* (2013.01); *C08K 5/06* (2013.01); *C08K 5/17* (2013.01); *C08K 5/5419* (2013.01); *C08L 27/24* (2013.01); *C09D 127/18* (2013.01); *C08L 2312/06* (2013.01)

(58) Field of Classification Search
CPC ...... C08L 27/18; C08L 27/24; C08L 2312/06; C08K 5/06; C08K 5/544; C08K 5/17; C08K 5/5419; C08J 5/18; C09D 127/18
See application file for complete search history.

(56) References Cited

U.S. PATENT DOCUMENTS

| | | |
|---|---|---|
| 3,235,544 A | 2/1966 | Christena |
| 3,243,429 A | 3/1966 | Ham |
| 3,250,807 A | 5/1966 | Fritz et al. |
| 3,250,808 A | 5/1966 | Moore |
| 3,332,907 A | 7/1967 | Angelo |
| 3,499,859 A | 3/1970 | Matherly et al. |
| 4,262,072 A | 4/1981 | Wendling |
| 4,349,650 A | 9/1982 | Krespan |
| 4,859,836 A | 8/1989 | Lunk et al. |
| 5,268,405 A | 12/1993 | Ojakaar |
| 5,274,159 A | 12/1993 | Pellerite et al. |
| 5,384,374 A | 1/1995 | Guerra et al. |
| 5,463,021 A | 10/1995 | Beyer et al. |
| 5,542,217 A | 8/1996 | Larivee, Jr. |
| 5,708,131 A | 1/1998 | Morgan |
| 5,880,204 A | 3/1999 | McCarthy et al. |
| 5,883,177 A | 3/1999 | Colaianna et al. |
| 6,248,823 B1 | 6/2001 | Hrivnak et al. |
| 6,299,799 B1 | 10/2001 | Craig et al. |

(Continued)

FOREIGN PATENT DOCUMENTS

| | | |
|---|---|---|
| CN | 1173883 A | 2/1998 |
| CN | 1671757 A | 9/2005 |

(Continued)

OTHER PUBLICATIONS

"Uses and Emissions of Liquid PFC Heat Transfer Fluids from the Electronic Sector", Office of Air and Radiation, Office of Atmospheric Programs, Climate Change Division, (2004).

Rodriguez_"Atmospheric chemistry of HFE-7300 and HFE-7500: Temperature dependent kinetics, atmospheric lifetimes, infrared spectra and global warming potentials", Atmospheric Environment, vol. 96, (2014), pp. 145-153.

3M™ Fused Silica as a Polymeric Filler, 3M Advanced Materials Division, 2018, 2 pages.

Ameduri, "Fluoroelastomers: synthesis, properties and applications", Progress in Polymer Science, Feb. 2001, vol. 26, No. 1, pp. 105-187.

Amorphous Hucsrapolymer Technical Documnnis, AGC Inc. Chemicals Company, 1 page.

(Continued)

Primary Examiner — Robert D Harlan
(74) Attorney, Agent, or Firm — Carolyn A. Fischer

(57) ABSTRACT

Compositions are described comprising at least one fluoropolymer, a solvent and an amino compound. The fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers. The fluoropolymer typically comprises one or more cure sites, such as nitrile or halogenated cure sites. The solvent typically comprises a branched, partially fluorinated ether. In preferred embodiments the amine compound further comprises a silane group. Also described are methods of making the coating composition, methods of coating a substrate with UV and/or thermal curing, and the coated substrate.

20 Claims, No Drawings

(56) References Cited

U.S. PATENT DOCUMENTS

| | | | |
|---|---|---|---|
| 6,630,047 B2 | 10/2003 | Jing | |
| 6,685,793 B2 | 2/2004 | Jing | |
| 6,720,360 B1 | 4/2004 | Grootaert | |
| 6,833,403 B1 | 12/2004 | Bladel | |
| 6,943,228 B2 | 9/2005 | Grootaert et al. | |
| 7,019,082 B2 | 3/2006 | Matyjaszewski et al. | |
| 7,019,083 B2 | 3/2006 | Grootaert et al. | |
| 7,026,032 B2 | 4/2006 | Lee et al. | |
| 7,288,619 B2 | 10/2007 | Qiu et al. | |
| 7,638,581 B2 | 12/2009 | Jing | |
| 7,892,280 B2 | 2/2011 | Pathak | |
| 8,776,837 B2 | 7/2014 | McKeen | |
| 8,969,500 B2 | 3/2015 | Hintzer et al. | |
| 9,296,918 B2 | 3/2016 | Olson | |
| 9,790,347 B2 | 10/2017 | Amos et al. | |
| 9,815,969 B2 | 11/2017 | Amos et al. | |
| 10,190,015 B2 | 1/2019 | Lloyd et al. | |
| 11,248,117 B2 | 2/2022 | Jiang et al. | |
| 11,254,764 B2 | 2/2022 | Verschuere | |
| 2003/0022073 A1 | 1/2003 | Wang | |
| 2004/0024134 A1 | 2/2004 | Grootaert et al. | |
| 2004/0077775 A1 | 4/2004 | Audenaert | |
| 2005/0171257 A1 | 8/2005 | Wakui | |
| 2005/0250921 A1 | 11/2005 | Qiu | |
| 2005/0261431 A1 | 11/2005 | Takahashi et al. | |
| 2006/0147723 A1 | 7/2006 | Jing | |
| 2006/0148971 A1 | 7/2006 | Jing et al. | |
| 2009/0018275 A1 | 1/2009 | Campbell et al. | |
| 2009/0087646 A1 | 4/2009 | Sirejacob | |
| 2011/0200826 A1 | 8/2011 | Wilczek | |
| 2012/0097159 A1 | 4/2012 | Iyer | |
| 2012/0154487 A1 | 6/2012 | Sambhy et al. | |
| 2014/0066572 A1 | 3/2014 | Corveleyn et al. | |
| 2014/0227533 A1 | 8/2014 | Murakami et al. | |
| 2015/0296614 A1 | 10/2015 | Williams et al. | |
| 2016/0194512 A1 | 7/2016 | Bandi et al. | |
| 2016/0194520 A1 | 7/2016 | Wilczek | |
| 2017/0130009 A1 | 5/2017 | Hosoda et al. | |
| 2018/0197927 A1 | 7/2018 | Tan et al. | |
| 2019/0136109 A1 | 5/2019 | Agapov et al. | |
| 2020/0048420 A1 | 2/2020 | Hosoda et al. | |
| 2020/0317948 A1 | 10/2020 | Terada et al. | |
| 2021/0139687 A1 | 5/2021 | Jing et al. | |

FOREIGN PATENT DOCUMENTS

| | | | |
|---|---|---|---|
| CN | 1871275 A | 11/2006 | |
| CN | 101679562 A | 3/2010 | |
| CN | 102471583 A | 5/2012 | |
| CN | 102559051 A | 7/2012 | |
| CN | 102604273 A | 7/2012 | |
| CN | 104870542 B | 6/2017 | |
| CN | 108047189 A | 5/2018 | |
| CN | 110914354 A | 3/2020 | |
| CN | 106687863 B | 7/2020 | |
| EP | 0540730 | 5/1993 | |
| EP | 1 127 935 A1 | 8/2001 | |
| EP | 1997795 | 12/2008 | |
| EP | 1155055 B2 | 4/2009 | |
| EP | 2617738 | 7/2013 | |
| EP | 3333229 A1 | 6/2018 | |
| EP | 3385325 | 10/2018 | |
| JP | 07202362 A | 8/1995 | |
| JP | 2001064465 | 3/2001 | |
| JP | 2005142572 A2 | 6/2005 | |
| JP | 2012162708 A2 | 8/2012 | |
| JP | 2014070101 | 4/2014 | |
| JP | 2015509113 T2 | 3/2015 | |
| KR | 2006-0083409 A | 7/2006 | |
| KR | 20060083409 A | 7/2006 | |
| KR | 2018-0044790 A | 5/2018 | |
| WO | 199220720 A1 | 11/1992 | |
| WO | WO 1998-11146 | 3/1998 | |
| WO | 2000/008076 | 2/2000 | |
| WO | 2002/04534 A2 | 1/2002 | |
| WO | WO 2002-44534 | 6/2002 | |
| WO | 2004011510 A1 | 2/2004 | |
| WO | 2005/017017 A1 | 2/2005 | |
| WO | 2005017017 A1 | 2/2005 | |
| WO | 2005049687 A1 | 6/2005 | |
| WO | WO 2006-086081 | 8/2006 | |
| WO | WO-2006086081 A1 * | 8/2006 | ............. C08J 3/005 |
| WO | WO 2006-102383 | 9/2006 | |
| WO | WO 2008-094758 | 8/2008 | |
| WO | 2011043973 A1 | 4/2011 | |
| WO | 2012106172 A2 | 8/2012 | |
| WO | WO 2014-075246 | 5/2014 | |
| WO | WO 2015-066868 | 5/2015 | |
| WO | WO 2015-088784 | 6/2015 | |
| WO | WO 2015-134435 | 9/2015 | |
| WO | 2015/187413 A1 | 12/2015 | |
| WO | 2016017801 A1 | 2/2016 | |
| WO | WO 2016-069674 | 5/2016 | |
| WO | 2016159102 A1 | 10/2016 | |
| WO | 2016/189000 A1 | 12/2016 | |
| WO | WO 2017-004496 | 1/2017 | |
| WO | WO 2017-070172 | 4/2017 | |
| WO | WO 2017-094710 | 6/2017 | |
| WO | WO 2018-107017 | 6/2018 | |
| WO | WO-2018107017 A1 * | 6/2018 | ......... C08F 214/262 |
| WO | 2019/018346 A1 | 1/2019 | |
| WO | 2019161153 A1 | 8/2019 | |
| WO | 2019203243 A1 | 10/2019 | |
| WO | 2019230568 A1 | 12/2019 | |
| WO | 2019239568 A1 | 12/2019 | |
| WO | WO 2019-239320 | 12/2019 | |
| WO | WO 2019-239322 | 12/2019 | |
| WO | 2020070589 A1 | 4/2020 | |
| WO | 2020132203 A1 | 6/2020 | |
| WO | 2020137879 A1 | 7/2020 | |
| WO | 2020145133 A1 | 7/2020 | |
| WO | 2021088198 A1 | 5/2021 | |
| WO | 2021090111 A1 | 5/2021 | |
| WO | 2021091864 A1 | 5/2021 | |

OTHER PUBLICATIONS

E, R and D glass properties, Saint-Gobain Vetrotex, 2 pages.
Fibertec, Microglass 9007D, 1 page.
Fibertec, Microglass 9110, 1 page.
Fibertec, Microglass 9132, 1 page.
International Search Report for PCT International Application No. PCT/IB2019/054868, mailed on Oct. 30, 2019, 6 pages.
International Search Report for PCT International Application No. PCT/IB2019/054870, mailed on Oct. 11, 2019, 4 pages.
International Search Report for PCT International Application No. PCT/IB2020/058660, mailed on Apr. 19, 2021, 4 pages.
International Search Report for PCT International Application No. PCT/IB2020/060061, mailed on Dec. 7, 2020, 4 pages.
Jing, "Fluoropolymer Compositions Comprising Amorphous Fluoropolymer and Crystalline Fluoropolymer Suitable for Copper and Electronic Telecommunications Articles", PCT Application No. IB2022/053284, filed Apr. 7, 2022, 69 pages.
Jing, "Fluoropolymer Compositions Comprising Fluoropolymer with Polymerized Unsaturated Fluorinated Alkyl Ether Suitable For Copper And Electronic Telecommunications Articles", PCT Application No. IB2022/053281, filed Apr. 7, 2022, 47 pages.
Jing, "Fluoropolymer Compositions Comprising Uncrosslinked Fluoropolymer Suitable for Copper and Electronic Telecommunications Articles", PCT Application No. IB2022/053241, filed Apr. 6, 2022, 46 pages.
Khaleel, "Design, Fabrication, and Testing of Flexible Antennas", Intech, 2013, pp. 363-383.
MIN-U-SIL, Fine Ground Silica, US Silica, Sep. 2017, 1 page.
Nittobo New Glass fabric for PCB, Nitto Boseki Co., Ltd., Nov. 2011, 28 pages.
Oliver, "Low-Loss Materials in High Frequency Electronics and the Challenges of Measurement", DuPont, Feb. 2015, 45 pages.
Owens, "Estimation of the Surface Free Energy of Polymers", Journal of Applied Polymer Science, 1969, vol. 13, pp. 1741-1747.

(56) References Cited

OTHER PUBLICATIONS

Perez, Cytop™, 4 pages.
Polymide, Wikipedia, 5 pages.
Qiu, "Photolithographic Patterning of Cytop with Limited Contact Angle Degradation", Micromachines, 2018, vol. 9, No. 10, pp. 509(1)-509(10).
Qiu, "Electronic Telecommunications Articles and Compositions Comprising Fluroinated Curing Agents", PCT Application No. IB2022/053074, filed Apr. 1, 2022, 66 pages.
Review of Polyimides Used in the Manufacturing of Micro Systems, NASA Center for AeroSpace Information (CASI), Apr. 2007, 16 pages.
Runt, "Polymer blends and copolymer", Handbook of Thermal Analysis and Calorimetry, Applications to Polymers and Plastics, 2002, vol. 3, pp. 273-294.
Tanaka, "Miscibility and Isomorphic Cocrystallization in Blends of Ferroelectric Copolymers of Vinylidene Fluoride and Trifluoroethylene", Journal of Polymer Science: Part B: Polymer Physics, 1990, vol. 28, pp. 2183-2198.
Types of Antenna Coatings, Telewave, Inc., Sep. 2017, 5 pages.
Weldon, "Flex for 5G—Why Materials Matter", DuPont, 2018, 16 pages.
3M Dyneon Fluoroelastomers Compounding Guide, 3M Advanced Materials Division, 28 pages.
3M Dyneon Fluoroelastomers Product Guide, 3M Advanced Materials Division, 20 pages.
3M Novec 7300 Engineered Fluid, 16 pages.
3M™ Dynamar™ Rubber Curative RC 5125, 2014, 3M Safety Data Sheet, 11 pages.
Milker, "New Generation of Multifunctional Crosslinkers", 28 pages.
Owens, "Understanding the stability and environmental characteristics of a sustainable halon alternative", 3M Performance Materials. 12 pages.
Scheirs, Modern Fluoropolymers, 397-418 (1997).
Scheirs, Modern Fluoropolymers, 541-555 (1997).
Silane Coupling Agents, Connecting Across Boundaries, Gelest Inc., 2006, 12 pages.
Ullmann's, Encyclopedia of Industrial Chemistry, 4-6 (2013).
International Search Report for PCT International Application No. PCT/US2019/036460, mailed on Sep. 20, 2019, 6 pages.

\* cited by examiner

FLUOROPOLYMER COATING COMPOSITIONS COMPRISING AMINE CURING AGENTS, COATED SUBSTRATES AND RELATED METHODS

CROSS REFERENCE TO RELATED APPLICATIONS

This application is a national stage filing under 35 U.S.C. 371 of PCT/US2019/036460, filed Jun. 11, 2019, which claims the benefit of U.S. Application No. 62/683,727, filed Jun. 12, 2018, and U.S. Application No. 62/859,404, filed Jun. 10, 2019, the disclosures of which are incorporated by reference in their entirety herein.

SUMMARY

In one embodiment, a composition is described comprising at least one fluoropolymer, wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; a solvent comprising a branched, partially fluorinated ether and wherein the partially fluorinated ether corresponds to the formula:

$$Rf\text{—}O\text{—}R$$

wherein Rf is a selected from perfluorinated and partially fluorinated alkyl or (poly)ether groups and R is selected from partially fluorinated and non-fluorinated alkyl groups; and a compound comprising at least one amine group and at least one organosilane group.

In another embodiment, a composition is described comprises at least one fluoropolymer, wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof; a fluorinated solvent; and a compound comprising at least one amine group and at least one silane group.

In other embodiments, methods of making (fluorinated solvent-based) compositions are described comprising dissolving the fluoropolymer in the solvent and adding the curing agent subsequently, concurrently, or after dissolving the fluoropolymer in the solvent.

In another embodiment, a substrate comprising a coated surface is described wherein the surface comprises a cross-linked fluoropolymer, wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof; and a compound comprising at least one amine group and at least one silane group.

In another embodiment, a polymer sheet is described comprising a fluoropolymer wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof; and a compound comprising at least one amine group and at least one silane group.

In another embodiment, a method of making a coated substrate is described comprising i) applying a coating composition to a substrate wherein the coating composition comprises at least one fluoropolymer, wherein the fluoropolymer comprises cure sites and at least 90% by weight based on the total weight of the fluoropolymer of polymerized units derived from perfluorinated monomers selected from tetrafluoroethene (TFE) and one or more unsaturated perfluorinated alkyl ethers; fluorinated solvent, and an amine curing agent; ii) removing the solvent; and iii) curing the fluoropolymer at a temperature ranging from 135° C. to 170° C. concurrently or prior to removing the solvent.

In another embodiment, a method of making a coated substrate is described comprising i) applying a coating composition to a substrate wherein the coating composition comprises at least one fluoropolymer, wherein the fluoropolymer comprises cure sites selected from iodine, bromine, and chlorine and at least 90% by weight based on the total weight of the fluoropolymer of polymerized units derived from perfluorinated monomers selected from tetrafluoroethene (TFE) and one or more unsaturated perfluorinated alkyl ethers; fluorinated solvent, and an amine curing agent; ii) removing the solvent; and iii) curing the fluoropolymer with ultraviolet radiation.

DETAILED DESCRIPTION

Presently described are coating compositions comprising certain fluoropolymers and a fluorinated solvent, coated substrates, and methods of making the compositions and the coated substrates.

The fluoropolymers described herein are copolymers that comprise predominantly, or exclusively, (e.g. repeating) polymerized units derived from two or more perfluorinated comonomers. Copolymer refers to a polymeric material resulting from the simultaneous polymerization of two or more monomers. The comonomers include tetrafluoroethene (TFE) and one or more unsaturated perfluorinated (e.g. alkenyl, vinyl) alkyl ethers.

In some favored embodiments, the one or more unsaturated perfluorinated alkyl ethers are selected from the general formula:

$$R_f\text{—}O\text{—}(CF_2)_n\text{—}CF\text{=}CF_2$$

wherein n is 1 (allyl ether) or 0 (vinyl ether) and $R_f$ represents a perfluoroalkyl residue which may be interrupted once or more than once by an oxygen atom. $R_f$ may contain up to 10 carbon atoms, e.g. 1, 2, 3, 4, 5, 6, 7, 8, 9 or 10 carbon atoms. Preferably $R_f$ contains up to 8, more preferably up to 6 carbon atoms and most preferably 3 or 4 carbon atoms. In one embodiment $R_f$ has 3 carbon atoms. In another embodiment $R_f$ has 1 carbon atom. $R_f$ may be linear or branched, and it may contain or not contain a cyclic unit. Specific examples of $R_f$ include residues with one or more ether functions including but not limited to:

—$(CF_2)$—O—$C_3F_7$,
—$(CF_2)_2$—O—$C_2F_5$,
—$(CF_2)_{r3}$—O—$CF_3$,
—$(CF_2$—O$)$—$C_3F_7$,
—$(CF_2$—O$)_2$—$C_2F_5$,
—$(CF_2$—O$)_3$—$CF_3$,
—$(CF_2CF_2$—O$)$—$C_3F_7$,
—$(CF_2CF_2$—O$)_2$—$C_2F_5$,
—$(CF_2CF_2$—O$)_3$—$CF_3$,

Other specific examples for $R_f$ include residues that do not contain an ether function and include but are not limited to —$C_4F_9$, —$C_3F_7$, —$C_2F_5$, —$CF_3$, wherein the $C_4$ and $C_3$ residues may be branched or linear, but preferably are linear.

Specific examples of suitable perfluorinated alkyl vinyl ethers (PAVE's) and perfluorinated alkyl allyl ethers (PAAE's) include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2$=CF—O—$CF_2$—O—$C_2F_5$, $CF_2$=CF—O—$CF_2$—O—$C_3F_7$, $CF_3$—$(CF_2)_2$—O—$CF(CF_3)$—$CF_2$—O—CF$(CF_3)$—$CF_2$—O—CF=$CF_2$ and their allyl ether homologues. Specific examples of allyl ethers include $CF_2$=CF—$CF_2$—O—$CF_3$, $CF_2$=CF—$CF_2$—O—$C_3F_7$, $CF_2$=CF—$CF_2$—O—$(CF_3)_3$—O—$CF_3$.

Further examples include but are not limited to the vinyl ether described in European patent application EP 1,997,795 B1.

Perfluorinated ethers as described above are commercially available, for example from Anles Ltd., St. Petersburg, Russia and other companies or may be prepared according to methods described in U.S. Pat. No. 4,349,650 (Krespan) or European Patent 1,997,795, or by modifications thereof as known to a skilled person.

The fluoropolymers are derived predominantly or exclusively from perfluorinated comonomers including tetrafluoroethene (TFE) and one or more of the unsaturated perfluorinated alkyl ethers described above. "Predominantly" as used herein means at least 90% by weight based on the total weight of the fluoropolymer, of the polymerized units of the fluoropolymer are derived from such perfluorinated comonomers. In some embodiments, the fluoropolymer comprises at least 91, 92, 93, 94, 95, 96, or 97% by weight or greater of such perfluorinated comonomers, based on the total weight of the fluoropolymer. The fluoropolymers may contain at least 40, 45, or 50% by weight of polymerized units derived from TFE. In some embodiments, the maximum amount of polymerized units derived from TFE is no greater than 60% by weight.

The fluoropolymer typically comprises polymerized units derived from one or more of the unsaturated perfluorinated alkyl ethers (such as PMVE, PAVE, PAAE or a combination thereof) in an amount of at least 10, 15, 20, 25, 30, 45, or 50% by weight, based on the total polymerized monomer units of the fluoropolymer. In some embodiments, the fluoropolymer comprises no greater than 50, 45, 40, or 35% by weight of polymerized units derived from one or more of the unsaturated perfluorinated alkyl ethers (such as PMVE, PAVE, PAAE or a combination thereof), based on the total polymerized monomer units of the fluoropolymer. The molar ratio of units derived from TFE to the perfluorinated alkly ethers described above may be, for example, from 1:1 to 5:1. In some embodiments, the molar ratio ranges from 1.5:1 to 3:1.

In other embodiments, the fluoropolymer comonomers comprise predominantly, or exclusively comprise, (e.g. repeating) polymerized units derived from two or more perfluorinated comonomers including tetrafluoroethene (TFE) and one or more unsaturated cyclic perfluorinated alkyl ethers, such as 2,2-bistrifluoromethyl-4,5-difluoro-1,3 dioxole. Such fluoropolymers are commercially available as "TEFLON™ AF", "CYTOP™", and "HYFLON™".

The fluoropolymers may be thermoplastic but, in a preferred embodiment, the fluoropolymer is amorphous. As used herein, amorphous fluoropolymers are materials that contain essentially no crystallinity or possess no significant melting point (peak maximum) as determined by differential scanning calorimetry in accordance with DIN EN ISO 11357-3:2013-04 under nitrogen flow and a heating rate of 10° C./min. Typically, amorphous fluoropolymers have a glass transition temperature (Tg) of less than 26° C., less than 20° C., or less than 0° C., and for example from −40° C. to 20° C., or −50° C. to 15° C., or −55° C. to 10° C. The fluoropolymers may typically have a Mooney viscosity (ML 1+10 at 121° C.) of from about 2 to about 150, for example from 10 to 100, or from 20 to 70. For amorphous polymers containing cyclic perfluorinated alky ether units, the glass transition temperature is typically at least 70° C., 80° C., or 90° C., and may range up to 220° C., 250° C., 270° C., or 290° C. The MFI (297° C./5 kg) is between 0.1-1000 g/10 min.

The fluoropolymer is preferably a curable fluoropolymer that contains one or more cure sites. Cure sites are functional groups that react in the presence of a curing agent or a curing system to cross-link the polymers. The cure sites are typically introduced by copolymerizing cure-site monomers, which are functional comonomers already containing the cure sites or precursors thereof. The cure sites react with an amine curing agent thereby crosslinking (curing) the fluoropolymer. One indication of crosslinking is that the dried and cured coating composition was not soluble in the fluorinated solvent of the coating.

The cure sites may be introduced into the polymer by using cure site monomers, i.e. functional monomers as will be described below, functional chain-transfer agents and starter molecules. The fluoroelastomers may contain cure sites that are reactive to more than one class of curing agents. An example widely used in the art includes cure sites containing nitrile or nitrile groups. Such cure sites are reactive, for example, to amine curing agent, as well as peroxide curing agents.

The curable fluoroelastomers may also contain cure sites in the backbone or as pending groups in addition, or as an alternative to the cure sites at a terminal position. Cure sites within the fluoropolymer backbone can be introduced by using a suitable cure-site monomer. Cure site monomers are monomers containing one or more functional groups that can act as cure sites or contain a precursor that can be converted into a cure site.

In some embodiments, the cure sites comprise iodine or bromine atoms.

Iodine-containing cure site end groups can be introduced by using an iodine-containing chain transfer agent in the polymerization. Iodine-containing chain transfer agents will be described below in greater detail. Halogenated redox systems as described below may be used to introduce iodine end groups.

In addition to iodine cures sites, other cure sites may also be present, for example Br-containing cure sites or cure sites containing one or more nitrile groups. Br-containing cure sites may be introduced by Br-containing cure-site monomers. Nitrile-containing cure sites are typically introduced by cure site monomers containing a nitrile group.

Examples of cure-site comonomers include for instance:
(a) bromo- or iodo-(per)fluoroalkyl-(per)fluorovinylethers, for example including those having the formula:

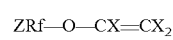

wherein each X may be the same or different and represents H or F, Z is Br or I, Rf is a C1-C12 (per)fluoroalkylene, optionally containing chlorine and/or ether oxygen atoms. Suitable examples include ZCF$_2$—O—CF=CF$_2$, ZCF$_2$CF$_2$—O—CF=CF$_2$, ZCF$_2$CF$_2$CF$_2$—O—CF=CF$_2$, CF$_3$CFZCF$_2$—O—CF=CF$_2$ or ZCF$_2$CF$_2$—O—CF$_2$CF$_2$CF$_2$—O—CF=CF$_2$ wherein Z represents Br of I; and (b) bromo- or iodo perfluoroolefins such as those having the formula:

Z'—(Rf)$_r$—CX=CX$_2$ wherein each X independently represents H or F, Z' is Br or I, Rf is a C$_1$-C$_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobutene-1,4-iodo-perfluorobutene-1, or bromo- or iodo-fluoroolefins such as 1-iodo,2,2-difluroroethene, 1-bromo-2,2-difluoroethene, 4-iodo-3,3,4,4,-tetrafluorobutene-1 and 4-bromo-3,3,4,4-tetrafluorobutene-1; 6-iodo-3,3,4,4,5,5,6,6-octafluorohexene-1.

In some embodiments, the cure sites comprise chlorine atoms. Such cure-site monomers include those of the general formula: CX$_1$X$_2$=CY$_1$Y$_2$ where X$_1$, X$_2$ are independently H and F; Y$_1$ is H, F, or Cl; and Y$_2$ is Cl, a fluoroalkyl group (R$_F$) with at least one Cl substituent, a fluoroether group (OR$_F$) with at least one Cl substituent, or —CF$_2$—OR$_F$. The fluoroalkyl group (R$_F$) is typically a partially or fully fluorinated C$_1$-C$_5$ alkyl group. Examples of cure-site monomer with chlorine atoms include CF$_2$=CFCl, CF$_2$=CF—CF$_2$C$_1$, CF$_2$=CF—O—(CF$_2$)$_n$—C$_1$, n=1-4; CH$_2$=CHCl, CH$_2$=CCl$_2$.

Typically, the amount of iodine or bromine or chlorine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer. In some embodiments, the curable fluoropolymer contains nitrile-containing cure sites, as a alternative or in addition to the I- and/or Br-cure sites described above. Fluoropolymers with nitrile-containing cure sites are known, such as described in U.S. Pat. No. 6,720,360.

Nitrile-containing cure sites may be reactive to other cure systems for example, but not limited to, bisphenol curing systems, peroxide curing systems, triazine curing systems, and especially amine curing systems. Examples of nitrile containing cure site monomers correspond to the following formulae:

CF$_2$=CF—CF$_2$—O—Rf—CN;

CF$_2$=CFO(CF$_2$)$_r$CN;

CF$_2$=CFO[CF$_2$CF(CF$_3$)O]$_p$(CF$_2$)$_v$OCF(CF$_3$)CN;

CF$_2$=CF[OCF$_2$CF(CF$_3$)]$_k$O(CF$_2$)$_u$CN;

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro (8-cyano-5-methyl-3,6-dioxa-1-octene), CF$_2$=CFO(CF$_2$)$_5$CN, and CF$_2$=CFO(CF$_2$)$_{30}$CF(CF$_3$)CN.

The amount of units derived from nitrile-containing cure site comonomers depends on the desired crosslinking density. The amount of nitrile-containing cure site comonomer is typically at least 0.5, 1, 1.5, 2, 2.5, 3. 3.5, 4, 4.5 or 5% by weight and typically no greater than 10% by weight; based on the total weight of the fluoropolymer. The fluoropolymers may also be of dual cure type, containing different cure sites that are reactive to different curing systems.

It is contemplated that by using halogenated chain transfer agents, terminal cure sites may be introduced. Chain transfer agents are compounds capable of reacting with the propagating polymer chain and terminating the chain propagation. Examples of chain transfer agents reported for the production of fluoroelastomers include those having the formula Rh, wherein R is an x-valent fluoroalkyl or fluoroalkylene radical having from 1 to 12 carbon atoms, which, may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane. Other examples include fluorinated di-iodo ether compounds of the following formula:

R$_f$—CF(I)—(CX$_2$)$_n$—(CX$_2$CXR)$_m$—O—R''f-O$_k$—(CXR'CX$_2$)$_p$—(CX$_2$)$_q$—CF(I)—R'$_f$ wherein X is independently selected from F, H, and C$_1$; R$_f$ and R'$_f$ are independently selected from F and a monovalent perfluoroalkane having 1-3 carbons; R is F, or a partially fluorinated or perfluorinated alkane comprising 1-3 carbons; R''$_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

The fluoropolymers may or may not contain units derived from at least one modifying monomer. The modifying monomers may introduce branching sites into the polymer architecture. Typically, the modifying monomers are bisolefins, bisolefinic ethers or polyethers. The bisolefins and bisolefinic (poly)ethers may be perfluorinated, partially fluorinated or non-fluorinated. Preferably they are perfluorinated. Suitable perfluorinated bisolefinic ethers include those represented by the general formula:

CF$_2$=CF—(CF$_2$)$_n$—O—(Rf)—O—(CF$_2$)$_m$—CF=CF$_2$ wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

CF$_2$=CF—O—(CF$_2$)$_n$—O—CF=CF$_2$ wherein n is an integer between 1 and 10, preferably 2 to 6, e.g. n may be 1, 2, 3, 4, 5, 6 or 7. More preferably, n represents an uneven integer, for example 1, 3, 5 or 7.

Further specific examples include bisolefinic ethers according the general formula

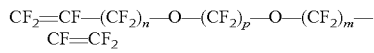

wherein n and m are independently either 1 or 0 and p is an integer from 1 to 10 or 2 to 6. For example, n may be selected to represent 1, 2, 3, 4, 5, 6 or 7, preferably, 1, 3, 5 or 7.

Further suitable perfluorinated bisolefinic ethers can be represented by the formula

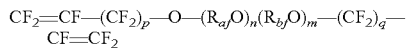

wherein $R_{af}$ and $R_{bf}$ are different linear or branched perfluoroalkylene groups of 1-10 carbon atoms, in particular, 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. Further, p and q are independent from each other either 1 or 0.

Such modifiers can be prepared by methods known in the art and are commercially available, for example, from Anles Ltd., St. Petersburg, Russia.

Preferably, the modifiers are not used or only used in low amounts. Typical amounts include from 0 to 5%, or from 0 to 1.4% by weight based on the total weight of the fluoropolymer. Modifiers may be present, for example, in amounts from about 0.1% to about 1.2% or from about 0.3% to about 0.8% by weight based on the total weight of fluoropolymer. Combinations of modifiers may also be used.

The fluoropolymers may contain partially fluorinated or non-fluorinated comonomers and combinations thereof, although this is not preferred. Typical partially fluorinated comonomers include but are not limited to 1,1-difluoroethene (vinylidenefluoride, VDF) and vinyl fluoride (VF) or trifluorochloroethene or trichlorofluoroethene. Examples of non-fluorinated comonomers include but are not limited to ethene and propene. The amount of units derived from these comonomers include from 0 to 8% by weight based on the total weight of the fluoropolymer. In some embodiments, the concentration of such comonomer is no greater than 7, 6, 5, 4, 3, 2, or 1% by weight based on the total weight of the fluoropolymer.

In a particularly preferred embodiment, the curable fluoropolymer is a perfluoroelastomer that comprises repeating units (exclusivel)y derived from the perfluorinated comonomers but may contain units derived from cure-site monomers, and modifying monomers if desired. The cure-site monomers and modifying monomers may be partially fluorinated, not fluorinated or perfluorinated, and preferably are perfluorinated. The perfluoroelastomers may contain from 69 to 73, 74, or 75% fluorine by weight (based on the total amount of perfluoroelastomer). The fluorine content may be achieved by selecting the comonomers and their amounts accordingly.

Such highly-fluorinated amorphous fluoropolymers typically do not dissolve to the extent of at least 1 wt. %, at room temperature and standard pressure, in a hydrogen-containing organic liquid (e.g., it does not dissolve in any of methyl ethyl ketone ("MEK"), tetrahydrofuran ("THF"), ethyl acetate or N-methyl pyrrolidinone ("NMP")).

The fluoropolymers can be prepared by methods known in the art, such as bulk, suspension, solution or aqueous emulsion polymerisation. For example, the polymerisation process can be carried out by free radical polymerization of the monomers alone or as solutions, emulsions, or dispersions in an organic solvent or water. Seeded polymerizations may or may not be used. Curable fluoroelastomers that can be used also include commercially available fluoroelastomers, in particular perfluoroelastomers.

The fluoropolymers may have a monomodal or bi-modal or multi-modal weight distribution. The fluoropolymers may or may not have a core-shell structure. Core-shell polymers are polymers where towards the end of the polymerization, typically after at least 50% by mole of the comonomers are consumed, the comonomer composition or the ratio of the comonomers or the reaction speed is altered to create a shell of different composition.

The fluoropolymer compositions described herein contain one or more curing agents including at least one amine curing agent.

Suitable curing agents for nitrile cure sites are known in the art and include, but are not limited to amidines, amidoximes and others described in WO2008/094758 A1, incorporated herein by reference. Such curing agents include nitrogen-containing nucleophilic compounds selected from heterocyclic secondary amines; guanidines; compounds which decompose in-situ at a temperature between 40° C. and 330"C to produce a guanidine; compounds which decompose in-situ at a temperature between 40° C. and 330° C. to produce a primary or secondary amine; nucleophilic compounds of the formula $R_1$—NH—$R_2$, wherein $R_1$ is H—, a $C_1$-$C_{10}$ aliphatic hydrocarbon group, or an aryl group having hydrogen atoms in the alpha positions, $R_7$ is a $C_1$-$C_{10}$ aliphatic hydrocarbon group, an aryl group having hydrogen atoms in the alpha positions, —$CONHR_3$, —$NHCO_2R_3$, or —OH', and $R_3$ is a $C_1$-$C_{10}$ aliphatic hydrocarbon group; and substituted amidines of the formula HN=$CR_4NR_5R_6$, wherein $R_4$, $R_5$, $R_6$ are independently H—, alkyl or aryl groups and wherein at least one of $R_4$, $R_5$ and $R_6$ is not H—.

As used herein, "heterocyclic secondary amine" refers to aromatic or aliphatic cyclic compound having at least one secondary amine nitrogen contained within the ring. Such compounds include, for example, pyrrole, imidazole, pyrazole, 3-pyrroline, and pyrrolidine.

Guanidines included in this disclosure are compounds derived from guanidine, i.e. compounds which contain the radical, —NHCNHNH—, such as, but not limited to, diphenylguanidine, diphenylguanidine acetate, aminobutylguanidine, biguanidine, isopentsilguanidine, di-o-tolylguanidine, o-tolylbiguanide, and triphenylguanidine.

In some embodiments, the curing agent is a compound that decomposes in-situ at a temperature between 40° C. and 330° C. to produce either a primary or secondary amine include, but are not limited to, di- or poly-substituted ureas (e.g. 1,3-dimethyl urea); N-alkyl or -dialkyl carbamates (e.g. N-(tert-butyloxycarbonyl)propylamine); di- or poly-substituted thioureas (e.g. 1,3-dimethyl-thiourea); aldehyde-amine condensation products (e.g. 1,3,5-trimethylhexahydro-1,3,5-triazine); N,N'-dialkyl phthalamide derivatives (e.g. N,N'-dimethylphthalamide); and amino acids.

Illustrative examples of nucleophilic compounds of formula $R_1$—NH—$R_2$ include, but are not limited to, aniline, t-butylcarbazate and $C_1$-$C_{10}$ aliphatic primary amines (such as methylamine). Illustrative examples of substituted amidines of the formula HN=$CR_4NR_5R_6$ include benzamidine and N-phenyl benzamidine.

In another embodiment, the amine curing agent is an aromatic or aliphatic cyclic compound having at least one tertiary amine nitrogen contained within the ring, or in other words a "heterocyclic tertiary amine." One such compound is 1,8-diazabicyclo [5.4.0] unde-7-ene.

It is surmised that most of these nucleophilic compounds act as curing agents by catalyzing the trimerization of polymer chain bound nitrile groups to form triazine rings, thus crosslinking the fluoroelastomer.

Another type of amine curing agent includes bis(aminophenols) and bis(aminothiophenols) of the formulae

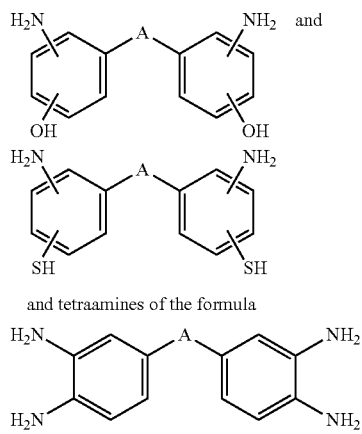

and tetraamines of the formula

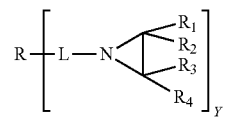

where A is $SO_2$, O, CO, alkyl of 1-6 carbon atoms, perfluoroalkyl of 1-10 carbon atoms, or a carbon-carbon bond linking the two aromatic rings. The amino and hydroxyl groups in the above formulas are interchangeably in the meta and para positions with respect to group A. Preferably, the second curing agent is a compound selected from the group consisting of 2,2-bis[3-amino-4-hydroxyphenyl]hexafluoropropane; 4,4'-sulfonylbis(2-aminophenol); 3,3-diaminobenzidine; and 3,3',4,4-tetraaminobenzophenone. The first of these curing agents are referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst.

In some embodiments, the (e.g. bis(aminophenols) and bis(aminothiophenols) are used in combination with an organotin compound. Suitable organotin compounds include allyl-, propargyl-, triphenyl- and allenyl tin curatives.

In some embodiments, the amine curing agent is an aliphatic diamine, such as ethylene diamine.

In some embodiments, the amine curing agent is an aziridine compound.

In some embodiments, the aziridine compound comprises at least two aziridine groups. The aziridine compound may comprise 3, 4, 5, 6, or greater than 6 aziridine groups. The aziridine compound may be represented by the following structure:

$$R - \left[ L - N \begin{array}{c} R_1 \\ R_2 \\ R_3 \\ R_4 \end{array} \right]_Y$$

wherein R is a core moiety having a valency of Y;
L is a bond, divalent atom, or divalent linking group;
$R_1$; $R_2$, $R_3$, and $R_4$ are independently hydrogen or a $C_1$-$C_4$ alkyl (e.g. methyl); and
Y is typically 2, 3, or greater.

In some embodiments, R is $-SO_2-$. In some embodiments, R-L is a residue of a multi(meth)acrylate compound. In some embodiments L is a $C_1$-$C_4$ alkylene, optionally substituted with one or more (e.g. contiguous or pendant) oxygen atoms thereby forming ether or ester linkages. In typical embodiments, $R_1$ is methyl and $R_2$, $R_3$, and $R_4$ are hydrogen.

Representative aziridine compounds include trimethylolpropane tri-[beta-(N-aziridinyl)-propionate, 2,2-bishydroxymethyl butanoltris[3-(1-aziridine) propionate]; 1-(aziridin-2-yl)-2-oxabut-3-ene; and 4-(aziridin-2-yl)-but-1-ene; and 5-(aziridin-2-yl)-pent-1-ene.

In some embodiments, a polyaziridine compound can be prepared by reacting divinyl sulfone with alkylene (e.g. ethylene) imine, such as described in U.S. Pat. No. 3,235,544 (Christena). On representative compound is di(2-propyleniminoethyl)sulfone, as depicted as follows:

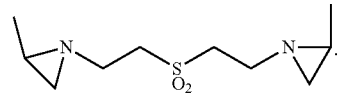

The above described polyaziridine compounds comprise at least two aziridine groups at the time the compound is added to the coating composition. In other embodiments, the polyaziridine compound does not comprise two aziridine groups at the time the compound is added to the coating composition, yet forms a polyaziridine in-situ. For example, compounds comprising a single aziridine group and a single (meth)acrylate group can form a dimer or oligomerize by reaction of the (meth)acrylate groups thereby forming a polyazirdine (i.e. diaziridine) compound.

In some favored embodiments, the composition comprises a compound comprising at least one (e.g. primary, secondary tertiary) amine group and at least one organosilane (e.g. alkoxy silane) group. Such compounds can improve bonding in combination with crosslinking certain fluoroelastomers.

In some embodiments, the amine curing agent may be characterized as an amino-substituted organosilane ester or ester equivalent that bear on the silicon atom at least one, and preferably 2 or 3 ester or ester equivalent groups. Ester equivalents are known to those skilled in the art and include compounds such as silane amides (RNR'Si), silane alkanoates (RC(O)OSi), Si—O—Si, SiN(R)—Si, SiSR and RCONR'Si compounds that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R', except it may not be H. These ester equivalents may also be cyclic such as those derived from ethylene glycol, ethanolamine, ethylenediamine (e.g. N-[3-(trimethoxylsilyl)propyl] ethylenediamine) and their amides.

Another such cyclic example of an ester equivalent is

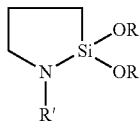

In this cyclic example R' is as defined in the preceding sentence, except that it may not be aryl. 3-aminopropyl alkoxysilanes are well known to cyclize upon heating, and these RNHSi compounds would be useful in this invention. Preferably the amino-substituted organosilane ester or ester equivalent has ester groups such as methoxy that are easily volatilized as methanol. The amino-substituted organosilane must have at least one ester equivalent; for example, it may be a trialkoxysilane.

For example, the amino-substituted organosilane may have the formula ($Z_2$N-L-SiX'X"X'"), wherein Z is hydrogen, alkyl, or substituted aryl or alkyl including amino-substituted alkyl; and L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit; and each of X', X", and X'" is a C1-18 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group.

L may be divalent aromatic or may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)-, —N(Rc)-C(O)—, —N(Rc)-C(O)—O—, —O—C(O)—N(Rc)—, —N(Rc)-C(O)—N(Rd)-, —O—C(O)—, —C(O)—O—, or —O—C(O)—O—. Each of Re and Rd, independently, is hydrogen, alkyl, alkenyl, alkynyl, alkoxyalkyl, aminoalkyl (primary, secondary or tertiary), or haloalkyl.

Examples of amino-substituted organosilanes include 3-aminopropyltrimethoxysilane (SILQUEST A-1110), 3-aminopropyltriethoxysilane (SILQUEST A-1100), bis(3-trimethoxysilylpropy)amine, bis(3-trimethoxysilylpropy)n-methylamine, 3-(2-aminoethyl)aminopropyltrimethoxysilane (SILQUEST A-1120), SILQUEST A-1130, (aminoethylaminomethyl)phenethyltrimethoxysilane, (aminoethylaminomethyl)-phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris(methoxyethoxyethoxy)silane, 3-aminopropylmethyldiethoxy-silane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and the following cyclic compounds:

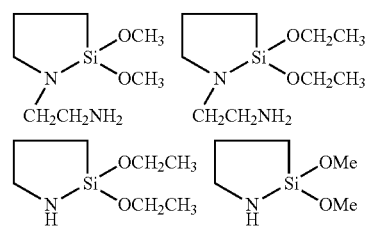

A bis-silyl urea [RO)$_3$Si(CH$_2$)NR]$_2$C═O is another example of an amino-substituted organosilane ester or ester equivalent.

In some embodiments, the curing agent may comprise an amino group having latent functionality. One example of such curing agent is a blocked amine group, such as

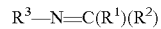

wherein $R^1$ and $R^2$ are independently selected from a linear or branched alkyl group comprising 1 to 6 carbon atoms. In typical embodiments $R_1$ is methyl, and $R^2$ a linear or branched alkyl group comprising at least 2, 3, 4, 5, or 6 carbon atoms. $R^3$ is typically an organic group (e.g. having a molecular weight less than 500, 450, 400, 350, 300, or 250 g/mole).

The blocked amine can be activated by moisture provided by water adsorbed on the surface of the substrate being coated or from humidity. Deblocking begins in minutes and is generally complete within a few (e.g. two) hours. During deblocking the —N═C($R^1$)($R^2$) group is converted to —NH$_2$ that can then react with the (e.g. nitrile cure sites) of the fluoropolymer.

In some embodiments, the curing agent comprises a blocked amine group and an alkoxy silane group. Such blocked amine curing agent can be characterized by the following general formula:

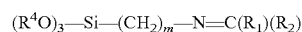

wherein $R^1$ and $R^2$ are independently selected from a linear or branched alkyl group comprising 1 to 6 carbon atoms as previously described $R^1$ is independently selected from a linear or branched alkyl group comprising 1 to 6 carbon atoms, m is an integer from 1 to 4, and each $R^4$ is independently a C1 or C2 alkyl group.

One illustrative curing agent comprising a blocked amine group and an alkoxy silane group is N-(1,3-dimethylbutyl-idene)aminopropyl-triethoxysilane, depicted as follows:

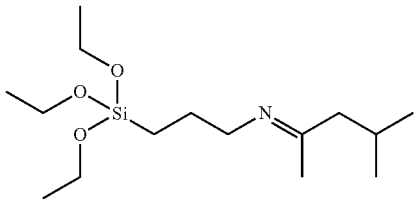 [SMILES: CCO[Si](CCC/N=C(\C)CC(C)C)(OCC)OCC]

Such curing agent is available from Gelest and from 3M as "3M™ Dynamer™ Rubber Curative RC5125".

In some embodiments, the amine curing agent comprises an aziridine group and an alkoxy silane group. Such compounds are known for examples from U.S. Pat. No. 3,243,429; incorporated herein by reference. Aziridine alkoxy silane compounds may have the general structure:

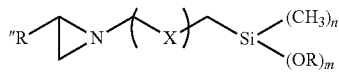

wherein R" is hydrogen or a C1-C4 alkyl (e.g. methyl);
X is a bond, a divalent atom, or a divalent linking group;
n is 0, 1 or 2;
m is 1, 2, or 3; and
and the sum or n+m is 3.

One representative compound is 3-(2-methylaziridinyl) ethylcarboxylpropyltriethoxysilane.

Various other suitable aziridine crosslinkers are known, such as described in WO2014/075246; published May 22, 2014, incorporated herein by reference; and "NEW GENERATION OF MULTIFUNCTIONAL CROSSLINKERS," (See https://www.pstc.org/files/public/Milker00.pdf).

A single amine (e.g. curing agent) compound may be used or a combination of amine (e.g. curing agent) compounds may be used. Thus, amine curing agent may be the sole curing agents. In this embodiment, the composition is free of multi-olefinic crosslinkers including perfluoropolyether multi-(meth)acrylate derivatives of "HFPO", as described in US 2006/0147723 (Jing, et al); incorporated herein by reference. Alternatively, the fluoropolymer composition may comprise such multi-olefinic crosslinkers including perfluoropolyether multi-(meth)acrylate derivatives of "HFPO" in combination with the amine curing agents(s) described herein.

The amount of amine (e.g. curing agent) is typically at least 0.01, 0.02, 0.03, 0.04, 0.05, 0.06, 0.07, 0.08, 0.09, 0.1, 0.2, 0.3, 0.4, or 0.5% by weight solids (i.e. excluding the solvent of the coating composition). In some embodiments, the amount of amine (e.g. curing agent) compound is no greater than 5, 4.5, 4. 3.5, or 3% by weight solids.

An appropriate level of curing agents can be selected by considering cure properties, for example the time to develop maximum moving die rheometer (MDR) torque and minimum Mooney scorch of the curable compositions. The optimum level will depend on the particular combination of fluoropolymer and curing agents, and the desired properties of the cured elastomer.

In some embodiments, the fluoropolymer composition comprises an amine curing agent in combination with an alkoxy silane compound that lacks amine functionality. In some embodiments, such alkoxy silanes may be characterized as "non-functional" having the chemical formula:

$$R^2Si(OR^1)_m$$

wherein $R^1$ is independently alkyl as previously described;
$R^2$ is independently hydrogen, alkyl, aryl, alkaryl, or O $R^1$; and
m ranges from 1 to 3, and is typically 2 or 3 as previously described.

Suitable alkoxy silanes of the formula $R^2Si(OR^1)_m$ include, but are not limited to tetra-, tri- or dialkoxy silanes, and any combinations or mixtures thereof. Representative alkoxy silanes include propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane dimethyldimethoxysilane and dimethyldiethoxysilane.

Preferably, the alkyl group(s) of the alkoxy silanes comprises from 1 to 6, more preferably 1 to 4 carbon atoms. Preferred alkoxysilanes for use herein are selected from the group consisting of tetra methoxysilane, tetra ethoxysilane, methyl triethoxy silane, dimethyldiethoxysilane, and any mixtures thereof. A preferred alkoxysilane for use herein comprises tetraethoxysilane (TEOS). The alkoxy silane lacking organofunctional groups utilized in the method of making the coating composition may be partially hydrolyzed, such as in the case of partially hydrolyzed tetramethoxysilane (TMOS) available from Mitsuibishi Chemical Company under the trade designation "MS-51".

When present, the amount of alkoxy silane compound that lacks functionality (e.g. TESO) is typically at least 0.01, 0.02, 0.03, 0.04, 0.05, 0.06, 0.07, 0.08, 0.09, 0.1, 0.2, 0.3, 0.4, or 0.5% by weight solids (i.e. excluding the solvent of the coating composition). In some embodiments, the amount of alkoxy silane compound that lacks functionality is no greater than 5, 4.5, 4. 3.5, or 3% by weight solids.

In some embodiments, an amine (e.g. curing agent) compound may be used in combination with a non-amine curing agent.

When present, the amount of non-amine curing agent is typically at least 0.01, 0.02, 0.03, 0.04, 0.05, 0.06, 0.07, 0.08, 0.09, 0.1, 0.2, 0.3, 0.4, or 0.5% by weight solids (i.e. excluding the solvent of the coating composition). In some embodiments, the amount of non-amine curing agent is no greater than 5, 4.5, 4. 3.5, or 3% by weight solids.

In one embodiments, the non-amine curing agent is an alkoxy silane that comprises other functional groups, such as in the case of 3-mercaptopropyl trimethoxysilane.

In other embodiments, the composition further comprises an organic peroxide, as a second curing agent. The peroxide will cause curing of the fluorinated polymer to form a cross-linked (cured) fluoropolymer when activated. Suitable organic peroxides are those which generate free radicals at curing temperatures. Examples include dialkyl peroxides or bis(dialkyl peroxides), for example, a di-tertiarybutyl peroxide having a tertiary carbon atom attached to the peroxy oxygen. Specific examples include 2,5-dimethyl-2,5-di(tertiarybutylperoxy)hexyne-3 and 2,5-dimethyl-2,5-di(tertiarybutylperoxy)hexane; dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)- butyl]carbonate. Generally, about 1 to 5 parts of peroxide per 100 parts of fluoropolymer may be used.

The curing agents may also be present on carriers, for example silica containing carriers. A peroxide cure system may also include in addition one or more coagent. Typically, the coagent includes a polyunsaturated compound which is capable of cooperating with the peroxide to provide a useful cure. These coagents may typically be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanurate; 2,4,6-trivinyl methyltrisiloxane; N,N'-m-phenylenebismaleimide; diallylphthalate and tri(5-norbornene-2-methylene)cyanurate. Particularly useful is triallyl isocyanurate.

In some embodiments, the fluoropolymer composition may also be cured using actinic irradiation, for example but not limited to e-beam curing, allowing for dual cure systems.

The fluoropolymer (coating solution) compositions comprises at least one solvent. The solvent is capable of dissolving the fluoropolymer. The solvent is typically present in an amount of at least 25% by weight based on the total weight of the coating solution composition. In some embodiments, the solvent is present in an amount of at least 30, 35, 40, 45, 50, 55, 60, 65, 70, 75, 80, 85, 90, 95% or greater based on the total weight of the coating solution composition.

The fluoropolymer (coating solution) composition typically comprises at least 0.01, 0.02, 0.03, 0.03, 0.04, 0.04, 0.05, 0.06, 0.7, 0.8. 0.9 or 1% by weight of fluoropolymer, based on the weight of the total coating solution composition. In some embodiments, the fluoropolymer coating solution composition comprises at least 2, 3, 4, or 5% by weight of fluoropolymer. In some embodiments, the fluoropolymer coating solution composition comprises at least 6, 7, 8, 9 or 10% by weight of fluoropolymer. The fluoropolymer coating solution composition typically comprises no greater than 50, 45, 40, 35, 30, 25, or 20% by weight of fluoropolymer, based on the weight of the total coating solution composition.

Optimum amounts of solvent and fluoropolymers may depend on the final application and may vary. For example, to provide thin coatings, very dilute solutions of fluoropolymer in the solvent may be desired, for example amounts of from 0.01% by weight to 5% by weight of fluoropolymer. Also for application by spray coating composition of low viscosity may be preferred over solutions with high viscosity. The concentration of fluoropolymer in the solution affects the viscosity and may be adjusted accordingly. An advantage of the present disclosure is that also solutions with high concentrations of fluoropolymer can be prepared that still provide clear liquid composition of low viscosity.

In some embodiments, the fluoropolymer coating solution compositions may be liquids. The liquids may have, for example, a viscosity of less than 2,000 mPas at room temperature (20° C.+/−2° C.). In other embodiments, the fluoropolymer coating solution compositions are pastes. The pastes may have, for example, a viscosity of from 2,000 to 100.000 mPas at room temperature (20° C.+/−2° C.).

The solvent is a liquid at ambient conditions and typically has a boiling point of greater than 50° C. Preferably, the solvent has a boiling point below 200° C. so that it can be easily removed. In some embodiments, the solvent has a boiling point below 190, 180, 170, 160, 150, 140, 130, 120, 110, or 100° C.

The solvent is partially fluorinated or perfluorinated. Various partially fluorinated or perfluorinated solvents are known including perfluorocarbons (PFCs), hydrochlorofluorocarbons (HCFCs), perfluoropolyethers (PFPEs), and hydrofluorocarbons (HFCs), as well as fluorinated ketones and fluorinated alkyl amines.

In some embodiments, the solvent has a global warming potential (GWP, 100 year ITH) of less than 1000, 900, 800, 700, 600, 500, 400, 300, 200 or 100. The GWP is typically greater than 0 and may be at least 10, 20, 30, 40, 50, 60, 70, or 80.

As used herein, GWP is a relative measure of the global warming potential of a compound based on the structure of the compound. The GWP of a compound, as defined by the Intergovernmental Panel on Climate Change (IPCC) in 1990 and updated in subsequent reports, is calculated as the warming due to the release of 1 kilogram of a compound relative to the warming due to the release of 1 kilogram of $CO_2$ over a specified integration time horizon (ITH).

$$GWP_x = \frac{\int_0^{ITH} F_x C_{xo} \exp(-t/\tau_x) dt}{\int_0^{ITH} F_{CO_2} C_{CO_2}(t) dt}$$

where F is the radiative forcing per unit mass of a compound (the change in the flux of radiation through the atmosphere due to the IR absorbance of that compound), $C_o$ is the atmospheric concentration of a compound at initial time, $\tau$ is the atmospheric lifetime of a compound, t is time, and x is the compound of interest.

In some embodiments, the solvent comprises a partially fluorinated ether or a partially fluorinated polyether. The partially fluorinated ether or polyether may be linear, cyclic or branched. Preferably, it is branched. Preferably it comprises a non-fluorinated alkyl group and a perfluorinated alkyl group and more preferably, the perfluorinated alkyl group is branched.

In one embodiment, the partially fluorinated ether or polyether solvent corresponds to the formula:

Rf—O—R wherein Rf is a perfluorinated or partially fluorinated alkyl or (poly)ether group and R is a non-fluorinated or partially fluorinated alkyl group. Typically, Rf may have from 1 to 12 carbon atoms. Rf may be a primary, secondary or tertiary fluorinated or perfluorinated alkyl residue. This means, when Rf is a primary alkyl residue the carbon atom linked to the ether atoms contains two fluorine atoms and is bonded to another carbon atom of the fluorinated or perfluorinated alkyl chain. In such case Rf would correspond to $R_f^1$—$CF_2$— and the polyether can be described by the general formula:

$R_f^1$—$CF_2$—O—R.

When Rf is a secondary alkyl residue, the carbon atom linked to the ether atom is also linked to one fluorine atoms and to two carbon atoms of partially and/or perfluorinated alkyl chains and Rf corresponds to $(R_f^2 R_f^3)CF$—. The polyether would correspond to $(R_f^2 R_f^3)CF$—O—R.

When $R_f$ is a tertiary alkyl residue the carbon atom linked to the ether atom is also linked to three carbon atoms of three partially and/or perfluorinated alkyl chains and Rf corresponds to $(R_f^4R_f^5R_f^6)$—C—. The polyether then corresponds to $(R_f^4R_f^5R_f^6)$—C—OR. $R_f^1$; $R_f^2$; $R_f^3$; $R_f^4$; $R_f^5$; $R_f^6$ correspond to the definition of Rf and are a perfluorinated or partially fluorinated alkyl group that may be interrupted once or more than once by an ether oxygen. They may be linear or branched or cyclic. Also a combination of polyethers may be used and also a combination of primary, secondary and/or tertiary alkyl residues may be used.

An example of a solvent comprising a partially fluorinated alkyl group includes $C_3F_7OCHFCF_3$ (CAS No. 3330-15-2).

An example of a solvent wherein Rf comprises a perfluorinated (poly)ether is $C_3F_7OCF(CF_3)CF_2OCHFCF_3$ (CAS No. 3330-14-1).

In some embodiments, the partially fluorinated ether solvent corresponds to the formula:

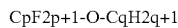

CpF2p+1-O-CqH2q+1 wherein q is an integer from 1 to and 5, for example 1, 2, 3, 4 or 5, and p is an integer from 5 to 11, for example 5, 6, 7, 8, 9, 10 or 11. Preferably, $C_pF_{2p+1}$ is branched. Preferably, $C_pF_{2p+1}$ is branched and q is 1, 2 or 3.

Representative solvents include for example 1,1,1,2,2,3,4,5,5,5-decafluoro-3-methoxy-4-(trifluoromethyl)pentane and 3-ethoxy-1,1,1,2,3,4,4,5,5,6,6,6-dodecafluroro-2-(trifluoromethyl)hexane. Such solvents are commercially available, for example, under the trade designation NOVEC from 3M Company, St. Paul, MN The fluorinated (e.g. ethers and polyethers) solvents may be used alone or in combination with other solvents, which may be fluorochemical solvents or non-fluorochemical solvents. When a non-fluorochemical solvent is combined with a fluorinated solvent, the concentration non-fluorochemical solvent is typically less than 30, 25, 20, 15, 10 or 5 wt-% with respect to the total amount of solvent. Representative non-fluorochemical solvents include ketones such as acetone, MEK, methyl isobutyl ketone, methyl amyl ketone and NMP; ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone.

Compositions containing curable fluoroelastomers may further contain additives as known in the art. Examples include acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The fluoropolymer composition may contain further additives, such as stabilizers, surfactants, ultraviolet ("UV") absorbers, antioxidants, plasticizers, lubricants, fillers, and processing aids typically utilized in fluoropolymer processing or compounding, provided they have adequate stability for the intended service conditions. A particular example of additives includes carbon particles, like carbon black, graphite, soot. Further additives include but are not limited to pigments, for example iron oxides, titanium dioxides. Other additives include but not limited to clay, silicon dioxide, barium sulphate, silica, glass fibers, or other additives known and used in the art.

The fluoropolymer compositions may be prepared by mixing the polymer, the curing agent(s) including at least one amine curing agent, optional additives and the fluorinated solvent. In some embodiments, the fluoropolymer is first dissolved in the fluorinated solvent and the other additives, including the curing agent(s) are added thereafter.

The coating composition described herein including fluorinated solvent is "stable, meaning that the coating composition remains homogeneous when stored for at least 24 hours at room temperature in a sealed container. In some embodiments, the coating composition is stable for one week or more. "Homogeneous" refers to a coating composition that does not exhibit a visibly separate precipitate or visibly separate layer when freshly shaken, placed in a 100 ml glass container and allowed to stand at room temperature for at least 4 hours.

In some embodiments, the fluoropolymer is first combined with other solid ingredients and in particular with the amine(s) described herein. The fluoropolymer and amine compounds can be combined in conventional rubber processing equipment to provide a solid mixture, i.e. a solid polymer containing the additional ingredients, also referred to in the art as a "compound". Typical equipment includes rubber mills, internal mixers, such as Banbury mixers, and mixing extruders. During mixing the components and additives (including the amine curing agent) are distributed uniformly throughout the resulting fluorinated polymer "compound" or polymer sheets. The compound is then preferably comminuted, for example by cutting it into smaller pieces and is then dissolved in the solvent.

The fluoropolymer coating solution compositions provided herein are suitable for coating substrates. The fluoropolymer coating solution compositions may be formulated to have different viscosities depending on solvent and fluoropolymer content and the presence or absence of optional additives. The fluoropolymer coating solution compositions typically contain or are solutions of fluoropolymers and may be in the form of liquids or pastes. Nevertheless, the compositions may contain dispersed or suspended materials but these materials preferably are additives and not fluoropolymers of the type as described herein. Preferably, the compositions are liquids and more preferably they are solutions containing one or more fluoropolymer as described herein dissolved in a solvent as described herein.

The fluoropolymer compositions provided herein are suitable for coating substrates and may be adjusted (by the solvent content) to a viscosity to allow application by different coating methods, including, but not limited to spray coating or printing (for example but not limited to ink-printing, 3D-printing, screen printing), painting, impregnating, roller coating, bar coating, dip coating and solvent casting.

Coated substrates and articles may be prepared by applying the fluoropolymer compositions to a substrate and removing the solvent. The curing may occur to, during, or after removing the solvent. The solvent may be reduced or completely removed, for example for evaporation, drying or by boiling it off. After removal of the solvent the composition may be characterized as "dried".

Curing may be achieved by the conditions suitable for the curing system and cure sites used. Depending on the cure sites and curing system used curing may be achieved by heat-treating the curable fluoroelastomer composition or at room temperature, or by irradiation, for example UV-curing or actinic irradiation, for example e-beam curing. The fluoropolymer composition, substrate, or both are transmissive to the curing radiation. In some embodiments, a combination of UV curing and thermal (e.g. post) curing is utilized. The curing is carried out at an effective temperature and effective time to create a cured fluoroelastomer. Optimum conditions can be tested by examining the fluoroelastomer for its mechanical and physical properties. Curing may be carried out under pressure or without pressure in an oven. A post curing cycle at increased temperatures and or pressure may be applied to ensure the curing process is fully completed. The curing conditions depend on the curing system used.

In some embodiments, the composition comprises at least one fluoropolymer comprising one or more halogenated cure sites (i.e. iodine, bromine, chlorine) and an amine curing agent. The composition is cured by UV-curing.

Without intending to be bound by theory, it is surmised that the amine curing agent functions as an electron donor and the halogenated cure sites function as an electron acceptor. Thus, the amine curing agent alone can initiate UV-curing in the absence of free-radical photoinitiators. Although, conventional free-radical initiators are not required, the composition can optionally further comprise photoinitiator. Useful photoinitiators include benzoin ethers such as benzoin methyl ether and benzoin isopropyl ether; substituted acetophenones; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(0-ethoxy-carbonyl)oxime.

In some embodiments, the UV radiation may have sufficient intensity at a wavelength of at least 190, 200, 205 or 210 nm. In some embodiments, the UV radiation may have sufficient intensity at a wavelength no greater than 700, 600, 500, 400 or 300 nm. In some embodiments, the UV radiation may have sufficient intensity at a wavelength ranging from 270-280 nm such that in the presence of an (e.g. amine) electron donor a wavelength-induced single electron transfer reaction may occur between C—I bonds. In some embodiments, the UV radiation may have sufficient intensity at a wavelength ranging below 240 nm (e.g. 150-200 nm) such that in the presence of an (e.g. amine) electron donor a wavelength-induced single electron transfer reaction may occur between C—Cl or C—Br bonds.

UV light sources can be of various types. Low light intensity sources, such as blacklights, generally provide intensities ranging from 0.1 or 0.5 mW/cm$^2$ (millwatts per square centimeter) to mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, VA). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the ethylenically unsaturated monomer(s) can be provided by various light sources such as light emitting diodes (UEDs), fluorescent blacklights, arc-lamps such as xenon-arc lamps and medium and low pressure mercury lamps (including germicidal lamps), microwave-driven lamps, lasers etc. or a combination thereof. The composition can also be polymerized with higher intensity light sources as available from Fusion UV Systems Inc. Lamps that emit ultraviolet or blue light are typically preferred. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds. In some embodiments, post curing may be carried out at a temperature between 170° C. and 250° C. for a period of 0.1 to 24 hours.

In some embodiments, post curing may be carried out at lower temperatures. Post curing at lower temperatures is amenable for coating heat sensitive substrates. In some embodiments, the post curing occurs at a temperature ranging from 100, 110, 120, 130, 135 or 140° C. up to 170° C. for a period of 5-10 minutes to 24 hours. In some embodiments, the temperature is no greater than 169, 168, 167, 166, 165, 164, 163, 162, 161, or 160° C. In some embodiments, the temperature is no greater than 135, 130, 125, or 120° C.

In favored embodiments, after curing the fluoropolymer is sufficiently crosslinked such that at least 80, 85, 90 wt. % or greater cannot be dissolved in fluorinated solvent (e.g. HFE7500) at a weight ratio of 5 grams of fluoropolymer in 95% by weight of fluorinated solvent.

The compositions may be used for impregnating substrates, printing on substrates (for example screen printing), or coating substrates, for example but not limited to spray coating, painting dip coating, roller coating, bar coating, solvent casting, paste coating. Suitable substrates may include any solid surface and may include substrate selected from glass, plastics (e.g. polycarbonate), composites, metals (stainless steel, aluminum, carbon steel), metal alloys, wood, paper among others. The coating may be coloured in case the compositions contains pigments, for example titanium dioxides or black fillers like graphite or soot, or it may be colorless in case pigments or black fillers are absent.

Bonding agents and primers may be used to pretreat the surface of the substrate before coating. For example, bonding of the coating to metal surfaces may be improved by applying a bonding agent or primer. Examples include commercial primers or bonding agents, for example those commercially available under the trade designation CHEMLOK. Articles containing a coating from the compositions provided herein include but are not limited to impregnated textiles, for example protective clothing. Textiles may include woven or non-woven fabrics. Other articles include articles exposed to corrosive environments, for example seals and components of seals and valves used in chemical processing, for example but not limited to components or linings of chemical reactors, molds, chemical processing equipment for example for etching, or valves, pumps and tubings, in particular for corrosive substances or hydrocarbon fuels or solvents; combustion engines, electrodes, fuel transportation, containers for acids and bases and transportation systems for acids and bases, electrical cells, fuel cells, electrolysis cells and articles used in or for etching.

An advantage of the coating compositions described herein is that the coating compositions can be used to prepare coatings of high or low thickness. In some embodiments, the dried and cured coating has a thickness of 0.1 microns to 1 or 2 mils. In some embodiments, the dried and cured coating thickness is at least 0.2, 0.3, 0.4, 0.5, or 0.6 microns. In some embodiments, the dried and cured coating thickness is at least 1, 2, 3, 4, 5, or 6 microns.

The dried and cured coating can exhibit good adhesion to various substrates (e.g. glass, polycarbonate,), as evidence by the coating exhibiting a 2, and preferably a 3 or 4 according to the Boiling Water Test described in the examples. In favored embodiments, the dried and cured coating is durable as evidence by the coating exhibiting a 2, and preferably a 3 or 4 according to the Abrasion Test described in the examples. In some embodiments, the coating is durable, according to the Abrasion Test after being subjected to the Boiling Water Test.

In some embodiments, the dried and cured coating has good hydrophobic and oleiphobic properties according to the Black Permanent Marker Resistance Test, i.e. the marker fluid beads and is easy to remove with a paper towel or cloth. In some embodiments, the dried and cured coating has good hydrophobic and oleiphobic properties, as determined by Contact Angle Measurements (as determined according to the test method described in the examples). In some embodiments, the advancing and/or receding contact angle with water can be at least 100, 105, 110, 115, 120, 125 or 130 degrees. In some embodiments, the advancing and/or receding contact angle with hexadecane can be at least 60, 65, 70, or 75 degrees. In some embodiments, the coating exhibits such contact angles, after being subjected to the Boiling Water Test or after being subject the Boiling Water Test and the Abrasion Test (as determined according to the test method described in the examples).

In some embodiments, the dried and cured coating exhibits good corrosion resistance (i.e. not corroded) according to the Acid/Base Corrosion Test described in the examples.

As used herein the term "partially fluorinated alkyl" means an alkyl group of which some but not all hydrogens bonded to the carbon chain have been replaced by fluorine. For example, an $F_2HC-$, or an $FH_2C-$ group is a partially fluorinated methyl group. Alkyl groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, residues of the formula $F_2ClC-OCF_3$ or $FHClC-O-CF_3$ are also partially fluorinated alkyl residues.

A "partially fluorinated ether" is an ether containing at least one partially fluorinated group, or an ether that contains one or more perfluorinated groups and at least one non-fluorinated or at least one partially fluorinated group. For example, $F_2HCO-CH_3$, $F_3C-O-CH_3$, $F_2HC-O-CFH_2$, and $F_2HC-O-CF_3$ are examples of partially fluorinated ethers. Ethers groups where the remaining hydrogen atoms have been partially or completely replaced by other atoms, for example other halogen atoms like chlorine, iodine and/or bromine are also encompassed by the term "partially fluorinated alkyl" as long as at least one hydrogen has been replaced by a fluorine. For example, ethers of the formula $F_2ClC-O-CF_3$ or $FHClC-O-CF_3$ are also partially fluorinated ethers.

The term "perfluorinated alkyl" or "perfluoro alkyl" is used herein to describe an alkyl group where all hydrogen atoms bonded to the alkyl chain have been replaced by fluorine atoms. For example, $F_3C-$ represents a perfluoromethyl group.

A "perfluorinated ether" is an ether of which all hydrogen atoms have been replaced by fluorine atoms. An example of a perfluorinated ether is $F_3C-O-CF_3$.

The following examples are provided to further illustrate the present disclosure without any intention to limit the disclosure to the specific examples and embodiments provided.

TABLE 1

Materials:

| Abbreviation | Description | Source |
| --- | --- | --- |
| PFE-131 | Nitrile-containing perfluoroelastomer | 3M Dyneon, St. Paul, MN |
| PFE-40 | Iodo-containing perfluoroelastomer | 3M Dyneon |
| PFE-60 | Bromo-containing perfluoroelastomer | 3M Dyneon |
| Novec 7500 (HFE-7500) | Fluorinated ether solvent | 3M Company, St. Paul, MN |
| PZ | Polyaziridine commercially available as the trade designation "CX-100" | DSM Coating Resins, LLC |
| DBU | 1,8-diazabicyclo [5.4.01 undec-7-ene | Alfa AEsar |
| APMS | (3-Aminopropyl)trimethoxy silane | Sigma-Aldrich |
| APES/APS | (3-Aminopropyl)triethoxysilane | Aldrich |
| N-ME-APMS | N-methylaminopropyl trimethoxysilane | Gelest Corporation |
| BTMPA | Bis(3-trimethoxysilylpropyl)amine | Gelest Corporation, Morrisville, PA |
| BTMP-ME-A | Bis(3-trimethoxysilylpropyl)-n-methylamine | Gelest Corporation |
| TMP-ETDA | N-[3-(Trimethoxysilyl)propyl] ethylenediamine | Gelest Corporation |
| Ethylene diamine | | Sigma-Aldrich |
| 3M™ Dynamer™ Rubber Curative RC5125 (RC5125) | N-(1,3-dimethylbutylidene)-3-(triethoxysilyl)-1-propaneamine | 3M, St. Paul, MN |
| Alkoxysilyl aziridine (SA) | 2-(2-methylzairidinyl) ethylcarboxypropyltriethoxysilane | Prepared as described in WO2015/066868 |
| DMAPS | N-dimethylaminopropyl silane | |
| TEOS | Tetraethoxysilane | Sigma-Aldrich, St. Louis, MO |
| TMOS | Tetramethyl orthosilicate | Sigma-Aldrich |
| MPS | 3-mercaptopropyl trimethoxy silane | Sigma-Aldrich |
| Darocur 1173 | 2-hydroxyl-2-methylpropiophenone | Sigma-Aldrich |
| Soda-lime float glass substrate | Cleaned with Alconox detergent (North White Plains, NY, available through Sigma-Aldrich,) water washed and IPA rinsed before use. | Cardinal Glass Industries (Eden Prairie, Minnesota USA). |

TABLE 1-continued

Materials:

| Abbreviation | Description | Source |
| --- | --- | --- |
| Aluminum Substrate | Cleaned by soaking in acetone/IPA for and wiped dry | LOFTech, St.Paul, MN |
| Carbon Steel Substrate | 1 × 3 × 0.1" or 3 × 6 × 0.1" Cleaned by abrading with 3M Company grade 320 sandpaper and subsequently rinsed with water and isopropyl alcohol (IPA). | LOFTech, St.Paul, MN |
| Stainless Steel Substrate | 1 × 3 × 0.1" or 3 × 6 × 0.1" Cleaned by abrading with 3M Company grade 320 sandpaper and subsequently rinsed with water and isopropyl alcohol (IPA). | LOFTech, St.Paul, MN |
| Polycarbonate Substrate | 4 mil thick | GE Advanced Materials Speciality film and sheet, Pittsfield, Mass. |
| PET Film | Clear PET film with primer on both sides | Mitsubishi |

Perfluoroelastomer Coating Solution Preparation:

Perfluoroelastomer (e.g. PFE131, PFE40, PFE60) gum was cut into pieces and dissolved in HFE-7500 solvent by constantly shaking or stirring the solution overnight to obtain a 5 or 10 wt % perfluoroelastomer (PFE131) in HFE-7500 solution. To the perfluoroelastomer solution was added the indicated amine (e.g. curing agent) compound, at the amounts described in the Tables below. Some of the coating solutions also contained TEOS as indicated in the Tables below. The coating solutions were stirred under vortex for 1-2 min at 2500 RPM or shaken, until the coating was homogeneous.

Crosslinking Test:

To the 5 wt % perfluoroelastomer (PFE131) in HFE-7500 solution was added the indicated amine curing agent(s) at the amounts described in Table 2. The solutions were well mixed and 3-5 mL of each coating solution was transferred into an aluminum foil dish using a plastic pipette. The solutions were dried and cured for 10 minutes in an oven at the temperature described in the Tables. Each of the resulting dried and cured coatings were removed from the dish and placed in HFE-7500 separately. The solutions were stirred overnight to determine if the dried and cured coating dissolved in the HFE-7500 solvent. Dried and cured coatings that were not soluble in the solvent were considered to be crosslinked (Y=Yes (i.e. crosslinked), N=No).

TABLE 2

Crosslinking Test Results of Dried & Cured Coatings Prepared from 5 wt % PFE131 in HFE-7500 and Amine Curing Agent

| Curing Agent, Wt % Solids | 100° C. | 120° C. | 140° C. | 175° C. |
| --- | --- | --- | --- | --- |
| Ex. 2-1 - APMS, 2 wt % | NT | Y | Y | NT |
| Ex. 2-2 - PZ, 2 wt % | NT | Y | Y | NT |
| Ex. 2-3 - DBU, 2 wt % | NT | Y | Y | NT |
| Ex 2-4 - Alkoxysilyl aziridine (SA), 2 wt % | NT | Y | Y | NT |
| Ex. 2-5 - RC5125, 3 wt % | NT | Y | Y | NT |
| Ex. 2-6 - BTMPA, 3 wt % | NT | Y | Y | NT |
| Ex. 2-7 - MPS/DMAPS = 9/1 wt ratio, 5 wt % | NT | Y | Y | Y |
| Ex. 2-8 - DMAPS, 2 wt % | NT | Y | Y | Y |
| Ex. 2-9 - RC5125 - 3 wt %/ TEOS, 1.5 wt % | Y | Y | Y | Y |
| Ex. 2-10 - BTMPA- 3 wt %/ TEOS 1.5 wt % | Y | Y | Y | Y |

NT—Not Tested

Coating the Perfluoroelastomer Coating Solution onto a Glass Substrate

The coating solutions were applied with a No. 12 Meyer rod to the glass substrate (described in Table 1). Unless specified otherwise, the coatings were dried and cured for 10 minutes at the temperature specified in the Tables. The 5 wt-% solutions provided a dried and cured coating thickness of 1-3 microns. The 10 wt-% solutions provided a dried and cured coating thickness of 2-6 microns. The 1 wt-% solutions provided a dried and cured coating thickness of 0.2-0.6 microns. The coated substrate was evaluated with the following tests.

Coating Solution Shelf-Life:

Coating solution shelf-life was determined by the coating solution flowability. The time from solution preparation until the solution became non-flowable was defined as the shelf-life.

Bonding Evaluation:

The bonding of the dried and cured coating to the substrate was evaluated according to the following criteria.
    0—Coating boiled off
    1—Coating peels off easily
    2—Coating peels off with moderate force
    3—Coating peels off with greater force
    4—Coating breaks upon peeling Boiling Water Test:

The coated glass substrate having the dried and cured coating was submerged in a beaker of boiling water for 2 hours. After boiling, the bonding was evaluated as described above.

Abrasion Testing:

A TABER 5900 liner abrader (obtained from Taber Industries of North Tonawanda, NY) fitted with a 2.5 cm button covered with a KIMBERLY-CLARK L-30 WYPALL towel (obtained from Kimberly Clark of Roswell, GA) and a 5.1 cm×5.1 cm crock cloth (obtained from Taber Industries, North Tonawanda, NY). The samples were abraded for 200 to 500 cycles at a rate of cycles/minute (1 cycle consisted of a forward wipe followed by a backward wipe) with a load of 1000 grams following ASTM D0460 and a stroke length of 5.1 cm.

Abrasion Testing was conducted on coated substrates before and after the coated substrate was subjected to the Boiling Water Test. After Abrasion Testing the coated sample was evaluated according to the following criteria:
    0—Coating is completely abraded off
    1—Coating is partially abraded off 2—Coating is slightly abraded off, visible abrasion mark on coating 3—Coating is not abraded off, visible abrasion mark on coating 4—Coating is not abraded off, very faint abrasion mark on coating Black Permanent Marker Resistance Test:

A 3-5 mm wide straight line was drawn on the dried and cured coating of the coated substrate using a black Sharper™ permanent marker with the help of a ruler at a speed of roughly 6 inches per second (0.15 m/s). If the marker fluid on the dried and cured coating beads and is easy to remove with a paper towel or a cloth, the coating surface was considered to have "Good" hydrophobic and oleophobic. In contrast, if the mark left on the coating surface is a solid line, and difficult to remove with a paper towel or a cloth, such a surface was not considered to be an oleophobic surface.

Contact Angle Measurement:

Contact angle measurements were made on the dried and cured coating of the coated glass substrate before and after subjecting the sample to Abrasion Testing. The Abrasion Testing was conducted on samples before and after being subjected to the Boiling Water Test. The resulting coatings were rinsed for 1 minute by hand agitation in isopropanol alcohol before being subjected to measurement of water and hexadecane contact angles. Measurements were made using as-received reagent-grade hexadecane (Sigma-Aldrich) and deionized water filtered through a filtration system obtained from Millipore Corporation (Billerica, MA), on a video contact angle analyzer available as product number VCA-2500XE from AST Products (Billerica, MA). Reported values were the averages of measurements on at least three drops measured on the right and the left sides of the drops, and are shown in the Tables. Drop volumes were 5 microliters for static measurements and 1-3 microliters for advancing and receding contact angles. For hexadecane, only advancing and receding contact angles are reported because the static and advancing values were found to be nearly equal.

TABLE 3

Test Results of Dried & Cured Coatings Prepared from 5 wt % PFE131 and RC5125 Amine Curing Agent in HFE on Glass Substrate Cured at 140° C.

| Wt % Solids RC5125, Wt % solids TEOS | Boiling Water Test | Abrasion Test (200 cycles) | | Black Permanent Marker Resistance Test | Cross-linking Test | Coating Solution Shelf-life |
|---|---|---|---|---|---|---|
| | | Before in boiling water | After in boiling water | | | |
| Ex. 3-1 - Comparative PFE131/no RC5125 | 0 | 1 | NT | Good | No | 24+ hrs |
| Ex. 3-2 - 0.25 wt % | 1 | 1 | NT | Good | NT | 6 hrs |
| Ex. 3-3 - 0.5 wt % | 1 | 2 | 2 | Good | Yes | 5 hrs |
| Ex. 3-4 - 1 wt % | 1 | 2 | 3 | Good | NT | NT |
| Ex. 3-5 - 1.5 wt % | 2 | 4 | 4 | Good | Yes | 53 hrs |
| Ex. 3-6 - 1.5 wt %, 1.5 wt % TEOS | 2 | 4 | 4 | Good | Yes | 53 hrs |
| Ex. 3-7 - 1.5 wt %, 3 wt % TEOS | 2 | 3 | NT | Good | Yes | NT |
| Ex. 3-8 - 3 wt % | 3 | 4 | 4 | Good | Yes | 29 hrs |
| Ex. 3-9 - 3 wt %, 1.5 wt % TEOS | 3 | 4 | 4 | Good | Yes | 32 hrs |
| Ex. 3-10 - 5 wt % | 3 | 4 | 2 | Good | Yes | <10 hrs |
| Ex. 3-11 - 5 wt %, 1.5 wt % TEOS | 3 | 4 | 4 | Good | Yes | <10 hrs |

NT—Not Tested

TABLE 4

Test Results of Dried & Cured Coatings Prepared from 5 wt % PFE131 and BTMPA Amine Curing Agent in HFE on Glass Substrate at 140° C.

| Wt % Solids BTMPA, Wt % solid TEOS | Boiling Water Test | Abrasion Test (200 cycles) | | Black Permanent Marker Resistance Test | Cross-linking Test | Coating Solution Shelf-life |
|---|---|---|---|---|---|---|
| | | Before in boiling water | After in boiling water | | | |
| Ex. 4-1 - 0.5 wt % | 1 | NT | NT | Good | NT | 24+ hrs |
| Ex. 4-2 - 1 wt % | 1 | NT | NT | Good | NT | 24+ hrs |
| Ex. 4-3 - 1.5 wt % | 2 | 4 | 4 | Good | Yes | 70 hrs |
| Ex. 4-4 - 1.5 wt %, 1.5 wt % TEOS | 2 | 4 | 4 | Good | Yes | 70 hrs |
| Ex. 4-5 - 3 wt % | 4 | 4 | 4 | Good | Yes | 30 hrs |
| Ex. 4-6 - 3 wt %, 1.5 wt % TEOS | 4 | 4 | 4 | Good | Yes | 33 hrs |
| Ex. 4-7 - 5 wt % | 4 | 4 | 4 | Good | Yes | 10 hrs |

NT—Not Tested

TABLE 5

Test Results of Dried & Cured Coatings Prepared from 5 wt % PFE131 and RC5125 or BTMPA Amine Curing Agent in HFE on Glass Plate Substrate at 160° C.

| Wt % Solids Amine Curing Agent, Wt % solids TEOS | Boiling Water Test | Abrasion Test (200 cycles) Before in boiling water | Abrasion Test (200 cycles) After in boiling water | Black Permanent Marker Resistance Test | Cross-linking Test | Coating Solution Shelf-life |
|---|---|---|---|---|---|---|
| Ex. 5-1 - 1 wt % RC5125, 1 wt % TEOS | 1 | 3 | NT | Good | Yes | NT |
| Ex. 5-2 - 1.5 wt % RC5125, 1.5 wt % TEOS | 2 | 3 | NT | Good | Yes | 53 hrs |
| Ex. 5-3 - 3 wt % BTMPA | 4 | 4 | 4 | Good | Yes | 30 hrs |
| Ex. 5-4 - 3 wt % BTMPA, 1.5 wt % TEOS | 4 | 4 | 4 | Good | Yes | 33 hrs |

NT—Not Tested

TABLE 6

Test Results of Dried & Cured Coatings Prepared from 5 wt % PFE131 and RC5125 or APMS Amine Curing Agent in HFE on Glass Substrate at 175° C.

| Wt % Solids Amine Curing Agent, Wt % solids TEOS | Boiling Water Test | Abrasion Test (200 cycles) Before in boiling water | Abrasion Test (200 cycles) After in boiling water | Black Permanent Marker Resistance Test | Cross-linking Test | Coating Solution Shelf-life |
|---|---|---|---|---|---|---|
| Ex. 6-1 - Comparative PFE131 | 0 | NT | NT | Good | No | 24+ hrs |
| Ex. 6-2 - 0.25 wt % RC5125 | 1 | 2 | NT | Good | Yes | 6 hrs |
| Ex. 6-3 - 0.5 wt % RC5125 | 1 | 2 | NT | Good | Yes | <6 hrs |
| Ex. 6-4 - 1 wt % RC5125 | 1 | 3 | NT | Good | Yes | NT |
| Ex. 6-5 - 1.5 wt % RC5125 | 2 | 4 | NT | Good | Yes | 53 hrs |
| Ex. 6-6 - 1 wt % RC5125, 1 wt % TEOS | 1 | 4 | NT | Good | Yes | NT |
| Ex. 6-7 - 1.5 wt % RC5125, 1.5 wt % TEOS | 2 | 3 | NT | Good | Yes | 53 hrs |
| Ex. 6-8 - 1.5 wt % APMS | 3 | 4 | NT | Good | Yes | <2 hrs |

NT = Not Tested

TABLE 7

Test Results of Dried & Cured Coatings Prepared from 5 wt % PFE131 and RC5125 or BTMPA Amine Curing Agent in HFE on Glass Substrate at 175° C.

| Coating composition: Wt % Solids Amine Curing Agent, Wt % solids TEOS | 5 min Bonding after 2 hours in boiling water | 5 min Abrasion after in boiling (500 cycles) | 10 min Bonding after 2 hours in boiling water | 10 min Abrasion after 2 hours in boiling water (500 cycles) | 20 min Bonding after 2 hours in boiling water | 20 min Abrasion after 2 hours in boiling water (500 cycles) |
|---|---|---|---|---|---|---|
| Ex. 7-1 3 wt % RC5125 | 3 | 2 | 4 | 4 | 4 | 4 |
| Ex. 7-2 3 wt % RC5125, 1.5 wt % TEOS | 3 | 2 | 4 | 4 | 4 | 4 |
| Ex. 7-3 3 wt % BTMPA | 3 | 3 | 4 | 4 | 4 | 4 |
| Ex. 7-4 3 wt % BTMPA, 1.5 wt % TEOS | 3 | 3 | 4 | 4 | 4 | 4 |

TABLE 8

Test Results of Dried & Cured Coatings Prepared from
10 wt % PFE131 and RC5125 or BTMPA Amine Curing Agent
in HFE on Glass Substrate at 140° C. and 300° C.

| Coating composition: | 140° C. | | 300° C. | |
|---|---|---|---|---|
| Wt % Solids Amine Curing Agent, Wt % solids TEOS | Bonding before boiling | Bonding after boiling | Bonding before boiling | Bonding after boiling |
| Ex. 8-1<br>3 wt % RC5125,<br>1.5 wt % TEOS | 3 | 2 | 3 | 3 |
| Ex. 8-2<br>3 wt % BTMPA,<br>1.5 wt % TEOS | 3 | 2 | 3 | 3 |

TABLE 9

Advancing & Receding Contact Angle Test Results of Dried
& Cured Coatings Prepared from 1 wt % PFE131 and Amine
Curing Agent in HFE on Glass Substrate Cured at 160° C.

| Coating composition: | Initial Properties | | | | After Abrasion Test (500 cycles) | | | |
|---|---|---|---|---|---|---|---|---|
| | $H_2O$ | | Hexadecane | | $H_2O$ | | Hexadecane | |
| Wt % Solids Amine Curing Agent, Wt % solids TEOS | Adv. | Rec. | Adv. | Rec. | Adv. | Rec. | Adv. | Rec. |
| Ex. 9-1 - Control - PFE131 1 wt % solids in HFE-7500 | 127.8 | 90.6 | 72.6 | 53.8 | 17.1 | 5.5 | NT | NT |
| Ex. 9-2 - Control - PFE131 2.5 wt % solids in HFE-7500 | 133.4 | 95.8 | 79.3 | 59.1 | 12.4 | 4.6 | NT | NT |
| Ex. 9-3 - 3 wt % BTMPA, 1.5 wt % TEOS | 129.7 | 102.5 | 70.6 | 53.7 | 104.6 | 43.5 | 66.2 | 47.1 |
| Ex. 9-4 - 3 wt % RC5125, 1.5 wt % TEOS | 126.6 | 97.6 | 76.5 | 59.8 | 107.9 | 52.2 | 70.3 | 47.0 |

TABLE 10

Advancing & Receding Contact Angle Test Results of Dried
& Cured Coatings Prepared from 1 wt % PFE131 and Amine
Curing Agent in HFE on Glass Substrate Cured at 160° C.

| Coating composition: | After 2 Hours in Boiling Water, Before Abrasion | | | | After 2 Hours in Boiling Water, After Abrasion Test (500 cycles) | | | |
|---|---|---|---|---|---|---|---|---|
| | $H_2O$ | | Hexadecane | | $H_2O$ | | Hexadecane | |
| Wt % Solids Amine Curing Agent, Wt % solids TEOS | Adv. | Rec. | Adv. | Rec. | Adv. | Rec. | Adv. | Rec. |
| Ex. 10-1 - Control - PFE131 1 wt % solids in FIFE-7500 | 15.9 | 8.3 | 11.0 | 6.9 | NT | NT | NT | NT |
| Ex. 10-2 - Control - PFE131 2.5 wt % solids in HFE-7500 | 14.8 | 4.7 | 12.3 | 5.6 | NT | NT | NT | NT |
| Ex. 10-3 - 3 wt % BTMPA, 1.5 wt % TEOS | 126.4 | 71.2 | 69.2 | 47.8 | 123.0 | 73.5 | 72.8 | 46.2 |
| Ex. 10-4 - 3 wt % RC5125, 1.5 wt % TEOS | 124.9 | 72.7 | 77.3 | 56.7 | 60.8 | 20.7 | 66.6 | 46.7 |

For the following table, the coating solutions were applied with a No. 12 Meyer rod to the polycarbonate substrate (described in Table 1) and cured for 10 minutes.

TABLE 11

Advancing & Receding Contact Angle Test Results of Dried & Cured Coatings Prepared from 1 wt % PFE131 and Amine Curing Agent in HFE on Polycarbonate Substrate Cured at 140° C.

| Coating composition: Wt % Solids Amine Curing Agent, Wt % solids TEOS | Bonding after 2 hours boiling | Abrasion (200 cycles) | |
|---|---|---|---|
| | | Before boiling | After boiling |
| Ex. 11-1 - Control - PFE131 1 wt % solids in HFE-7500 | 1 | 2 | 2 |
| Ex. 11-2 - 3 wt % RC5125 | 4 | 4 | 3 |
| Ex. 11-3 - 3 wt % RC5125, 1.5 wt % TEOS | 4 | 4 | 3 |
| Ex. 11-4 - 3 wt % BTMPA | 4 | 4 | 4 |
| Ex. 11-5 - 3 wt % BTMPA, 1.5 wt % TEOS | 4 | 4 | 4 |
| Ex. 11-6 - 1.5 wt % APMS | 3 | 4 | 4 |

Perfluoroelastomer Coating Solution Preparation:

10 wt % solutions of PFE131 with amine curing agents were prepared as described above. Some of the coating solutions also contained TEOS as indicted in the Table below.

Perfluoroelastomer PFE-131T2 gum was obtained by a compounding process (PFE 131 gum filled with 30 wt % carbon black and the indicated amine curing reagents). It was cut into pieces and dissolved in HFE-7500 solvent by constantly shaking or stirring the solution overnight to obtain a 10 wt % PFE131T2 in HFE-7500 solution. To the PFE 131 solution was added the indicated amine curing agent(s) at the amounts described in the Tables. The solutions were stirred under vortex for 1-2 min at 2500 RPM.

Coating the Perfluoroelastomer Coating Solution onto a Substrate:

The coating solutions described in the following Tables were coated onto the aluminum substrate (described in Table) by drop casting. The resulting coating coatings were allowed to air dry and were subsequently placed into an oven at 200° C. for 10 minutes. The thickness of the dried and cured coating was 1-2 mils. The coated substrates were evaluated with the following Acid/Base Corrosion Tests.

Acid/Base Corrosion Tests:

Concentrated NaOH (33 wt %) and dilute $HNO_3$ (7 wt %) were prepared. Coated substrates were then separately placed in the NaOH and $HNO_3$ solutions for 24 hours. The tested samples were taken out and rinsed with water to observe if the aluminum was corroded.

TABLE 12

Corrosion Test - Concentrated Aqueous NaOH

| Coating composition: Wt % Solids Amine Curing Agent, Wt % solids TEOS | Aqueous NaOH (33 wt %) |
|---|---|
| Ex. 12-1 - Control 10 wt % PFE-131 (no amine curing agent) | Corroded |
| Ex. 12-2 - 3 wt % BTMPA, 1.5 wt % TEOS | Very lightly corroded at the edge (may be due to imperfect coating) |
| Ex. 12-3 - 3 wt % RC5125, 1.5 wt % TEOS | Not corroded |

TABLE 13

Corrosion Test - Aqueous $HNO_3$

| Coating composition: Wt % Solids Amine Curing Agent, Wt % solids TEOS | Aqueous $HNO_3$ (7 wt %) |
|---|---|
| Ex. 13-1 - Control 10 wt % PFE-131 (no amine curing agent) | Corroded along the edge |
| Ex. 13-2 - 3 wt % BTMPA, 1.5 wt % TEOS | Not corroded |
| Ex. 13-3 - 3 wt % RC5125, 1.5 wt % TEOS | Slightly corroded at the edge |

TABLE 14

Corrosion Test - Aqueous NaOH

| Coating composition: Wt % Solids Amine Curing Agent, Wt % solids TEOS | Aqueous NaOH (33 wt %) |
|---|---|
| Ex. 14-1 - Control 10 wt % PFE131T2 (no amine curing agent) | Not corroded |
| Ex. 14-2 - 3% BTMPA, 1.5% TEOS | Not corroded |
| Ex. 14-3 - 3% RC5125, 1.5% TEOS | Not corroded |

TABLE 15

Corrosion Test - Aqueous $HNO_3$

| Coating composition: Wt % Solids Amine Curing Agent, Wt % solids TEOS | Aqueous $HNO_3$ (7 wt %) |
|---|---|
| Ex. 15-1 - Control 10 wt % PFE131T2 (no amine curing agent) | Not corroded |
| Ex. 15-2 - 3 wt % BTMPA, 1.5 wt % TEOS | Not corroded |
| Ex. 15-3 - 3 wt % RC5125, 1.5 wt % TEOS | Not corroded |

These same corrosion tests were repeated with the same coating compositions and curing conditions utilizing carbon steel and stainless steel as the substrate, as described in Table 1. The corrosion test results were substantially the same.

Samples were prepared by depositing the solutions with a No. 24 Meyer rod on PET films. The film was dried at ambient temperature for 2 hours and at 50 C for 20 min. After the samples were completely dried, the coated PET film samples were then placed on a wooden or a stainless steel board and UV cured by conveying the coated PET film samples at a rate of 30 feet/minute with a UV curing system having a 500 watt H-bulb UV lamp. The step of conveying the samples though the UV curing system was repeated for a total of 10 exposures (or in other words 10 runs). After UV curing, the coated PET film is then thermally cured at 120° C. for 5 min in an oven. The cured samples were peeled off partially from the PET film were weighted and subsequently recorded, and then dissolved in FIFE 7500 with a mass ratio of cured sample/HFE 7500=5/95 in a vial. The vial is subject to vigorous shaking overnight (~12 hours) before any observation regarding the extent of crosslinking was recorded as detailed in the following table. The precipitated samples remained in the HFE-7500 solutions were collected, dried and weighted as being PFE crosslinking product yields.

| Extent of Crosslinking | Description |
| --- | --- |
| Soluble | Completely soluble or most of sample is dissolved |
| Viscosity builds up | Partially soluble, HFE solution becomes viscous, small amount of precipitate (like small flakes or silks), inseparable |
| Swell, low yield | Noticeable precipitation, largely~medially swell, however a significant amount of sample is dissolved |
| Gel | Sample takes on the appearance of gel, largely swell, inseparable or difficult to separate |
| Swell | Insoluble, apparent swell and increase in volume, the HFE solution is viscous, inseparable or difficult to separate |
| Precipitate | Completely insoluble, a little to no swell, Intact film, HEF has very low viscosity, separable |

TABLE 16

Effect of an aminosilane ester on UV curing of PFE-40

| | Thermally cured at 120 C. for 5 minutes | UV cured for 10 runs + Thermally cured at 120 C. for 5 minutes |
| --- | --- | --- |
| Primary Amino silane | | |
| Ex. 16 - 0.5% APES | Soluble | Viscosity builds up |
| Ex. 17 - 1% APES | Soluble | Gel 64.75 wt % |
| Ex. 18 - 1.5% APES | Soluble | Swell 84.72 wt % |
| Ex. 19 - 3% APES | Soluble | Precipitate 86.06 wt % |
| Ex. 20 - 5% APES | Soluble | Precipitate 88.33 wt % |
| Ex. 21 - 3% APES 2% TEOS | Soluble | Precipitate 86.80 wt % |
| Ex. 22 - 3% APES 2% TMOS | Soluble | Precipitate 83.59 wt % |
| Ex. 23 - 1.5% APES 1% 1173 | Soluble | Swell 87.53 wt % |
| Ex. 24 - 3% APES 1% 1173 | Soluble | Precipitate 91.26 wt % |
| Ex. 25 - 3% APES 2% 1173 | Soluble | Precipitate 86.69 wt % |
| Ex. 26 - 5% APES 2% 1173 | Soluble | Precipitate 87.92 wt % |
| Ex. 27 - 5% APES 5% 1173 | Soluble | Precipitate |
| Secondary Amino silane | | |
| Ex. 28 - 1% N-ME-APMS | Soluble | Viscosity builds up |
| Ex. 29 - 2.5% N-ME-APMS | Soluble | Gel |
| Ex. 30 - 5% N-ME-APMS | Soluble | Gel 85.60 wt % |
| Ex. 31 - 5% N-ME-APMS 0.5% APES | Soluble | Precipitate 80.61 wt % |
| Ex. 32 - 5% N-ME-APMS 1% APES | Soluble | Precipitate 81.68 wt % |
| Tertiary Amino silane | | |
| Ex. 33 - 1% BTMP-Me-A | Soluble | Viscosity builds up |
| Ex. 34 - 5% BTMP-Me-A | Soluble | Gel |
| Ex. 35 - 5% BTMP-Me-A | Soluble | Swell |
| Primary + Secondary Amino silane | | |
| Ex. 36 - 3% TMP-ETDA | Soluble | Swell |

TABLE 17

Effect of amines on UV curing of PFE-40

| Primary amine | Thermally cured at 120° C. for 5 minutes | UV cured for 10 runs + Thermally cured at 120° C. for 5 minutes |
| --- | --- | --- |
| Ex. 37- 5% ethylenediamine | Soluble | Gel |
| Ex. 38 - 1% ethylenediamine | Soluble | Viscosity builds up |

TABLE 18

Effect of an aminosilane ester on UV curing PFE-60

| Primary Amino silane | Thermally cured at 120 C. for 5 minutes | UV cured for 10 runs + Thermally cured at 120 C. for 5 minutes |
| --- | --- | --- |
| Ex. 39 - 5% APES | Viscosity increase | Swell, 88.94 wt % |

Some of the compositions of Examples 16-39 were cured with a D-bulb instead of an H-bulb and provided similar crosslinking results.

What is claimed is:

1. A composition comprising
at least one fluoropolymer, wherein the fluoropolymer comprises cure sites and at least 90% by weight based on the total weight of the fluoropolymer of polymerized units derived from perfluorinated monomers selected from tetrafluoroethene (TFE) and one or more unsaturated perfluorinated alkyl ethers;
solvent comprising a branched, partially fluorinated ether and wherein the partially fluorinated ether corresponds to the formula:

wherein Rf is selected from perfluorinated and partially fluorinated alkyl or (poly)ether groups and R is selected from partially fluorinated and non-fluorinated alkyl groups; and
a curing agent comprising at least one amine group and at least one organosilane group.

2. The composition of claim 1 wherein the unsaturated perfluorinated alkyl ether has the general formula

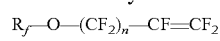

wherein n is 1 or 0 and $R_f$ is a perfluoroalkyl or perfluoroether group.

3. The composition of claim 1 wherein the compound is an amino organosilane ester compound or ester equivalent.

4. The composition of claim 1 wherein the compound comprises a blocked amine group.

5. The composition of claim 1 wherein the composition further comprises an alkoxy silane compound that lacks at least one amine groups.

6. The composition of claim 1 wherein the composition comprises 0.01 to 25% by weight of the fluoropolymer based on the weight of the total composition.

7. The composition of claim 1 wherein the partially fluorinated ether of the solvent corresponds to the formula:

$$C_pF_{2p+1}\text{—O—}C_qH_{2q+1}$$

wherein q is an integer from 1 to 5 and p is an integer from 5 to 11.

8. The composition according to claim 7 wherein the $C_pF_{2p+1}$— unit is branched.

9. The composition of claim 1 wherein the fluoropolymer comprises nitrile cure sites.

10. The composition of claim 1 wherein the fluoropolymer comprises one or more cure sites selected from iodine, bromine, chlorine, or a combination thereof.

11. The composition of claim 1 wherein the fluoropolymer comprises 40 to 60% by weight of polymerized units of TFE based on the total weight of the fluoropolymer.

12. The composition of claim 1 wherein the fluoropolymer contains 0 to 5 wt.-% of polymerized units derived from non-fluorinated or partially fluorinated monomers.

13. A composition comprising
at least one fluoropolymer, wherein the fluoropolymer comprises:
at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof;
a fluorinated solvent; and
a curing agent comprising at least one amine group and at least one silane group.

14. The composition of claim 13 wherein the solvent has a GWP of less than 1000.

15. The composition of claim 14 wherein the fluorinated solvent is a branched, partially fluorinated ether and wherein the partially fluorinated ether corresponds to the formula:

$$R_f\text{—O—R}$$

wherein $R_f$ is selected from perfluorinated and partially fluorinated alkyl or (poly)ether groups and R is selected from partially fluorinated and non-fluorinated alkyl groups.

16. The composition of claim 1 wherein the composition lacks a multi-olefinic crosslinker, free-radical photoinitiator, and combinations thereof.

17. A method of making the composition of claim 1 comprising dissolving the fluoropolymer in the solvent and adding the curing agent subsequently, concurrently, or after dissolving the fluoropolymer in the solvent.

18. A substrate comprising a coated surface wherein the coated surface comprises
a crosslinked fluoropolymer, wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof; and
a curing agent comprising at least one amine group and at least one silane group.

19. A polymer sheet comprising a fluoropolymer wherein the fluoropolymer comprises at least 90% by weight based on the total weight of the fluoropolymer of polymerized units derived from perfluorinated monomers selected from tetrafluoroethene (TFE) and one or more unsaturated perfluorinated alkyl ethers; and one or more cure sites selected from nitrile, iodine, bromine, or a combination thereof; and
a curing agent comprising at least one amine group and at least one silane group.

20. A method of making a coated substrate comprising:
i) applying a coating composition to a substrate wherein the coating composition comprises
at least one fluoropolymer, wherein the fluoropolymer comprises cure sites and at least 90% by weight based on the total weight of the fluoropolymer of polymerized units derived from perfluorinated monomers selected from tetrafluoroethene (TFE) and one or more unsaturated perfluorinated alkyl ethers;
fluorinated solvent, and
an amine curing agent comprising at least one amine group and at least one silane group;
ii) removing the solvent; and
iii) curing the fluoropolymer at a temperature ranging from 135° C. to 170° C. or curing the fluoropolymer with ultraviolet radiation concurrently or prior to removing the solvent.

* * * * *